US005198195A

United States Patent [19]

Yoda et al.

[11] Patent Number: 5,198,195

[45] Date of Patent: Mar. 30, 1993

[54] DEVELOPER TREATMENT APPARATUS

[75] Inventors: Akira Yoda; Yoshimitsu Sato; Shuichi Ohtsuka, all of Kanagawa, Japan

[73] Assignee: Fuji Photo Film Co., Ltd., Kanagawa, Japan

[21] Appl. No.: 766,915

[22] Filed: Sep. 27, 1991

Related U.S. Application Data

[63] Continuation of Ser. No. 287,380, Dec. 21, 1988, abandoned.

[30] Foreign Application Priority Data

| | | | |
|---|---|---|---|
| Dec. 28, 1987 | [JP] | Japan | 62-335063 |
| Jan. 14, 1988 | [JP] | Japan | 63-6402 |
| Jan. 18, 1988 | [JP] | Japan | 63-7820 |
| Jan. 22, 1988 | [JP] | Japan | 63-12100 |

[51] Int. Cl.[5] .......... B01J 8/02; B01J 35/02

[52] U.S. Cl. .......... 422/199; 355/202; 422/211; 431/268

[58] Field of Search .......... 422/199, 211, 219, 285, 422/288, 290; 355/202; 431/268

[56] References Cited

U.S. PATENT DOCUMENTS

| | | | |
|---|---|---|---|
| 1,193,798 | 8/1916 | Landis | 422/211 X |
| 1,266,162 | 5/1918 | Rosin | 431/268 |
| 1,347,631 | 7/1920 | Herck | 422/211 X |
| 1,753,897 | 4/1930 | Loeb | 431/268 X |
| 1,895,032 | 1/1933 | Fisher | 431/268 X |
| 1,994,932 | 3/1935 | Vidal | 422/199 X |
| 3,199,505 | 8/1965 | Lloyd | 431/268 X |
| 3,251,656 | 5/1966 | Edwards | 422/176 |
| 3,456,603 | 7/1969 | Studler | 110/214 |
| 3,469,947 | 9/1969 | Drury | 422/199 X |
| 3,549,333 | 12/1970 | Tabak | 431/5 X |
| 3,690,840 | 8/1970 | Volker | 165/66 X |
| 3,741,643 | 6/1973 | Smith et al. | 239/597 X |
| 3,790,466 | 2/1974 | Akiyama | 204/300 R |
| 3,837,785 | 9/1974 | Evans et al. | 431/5 |
| 4,213,766 | 7/1980 | Wyatt | 55/2 |
| 4,322,387 | 3/1982 | Virk et al. | 422/174 |
| 4,415,533 | 11/1983 | Kurotori et al. | 422/199 X |
| 4,538,899 | 9/1985 | Landa et al. | 422/199 X |
| 4,591,543 | 5/1986 | Outsuka et al. | 430/125 |
| 4,600,291 | 7/1986 | Ohtsuka et al. | 355/256 |
| 4,697,912 | 10/1987 | Sato et al. | 355/219 |
| 4,702,892 | 10/1987 | Betz | 422/171 |
| 4,719,090 | 1/1988 | Masaki | 422/310 |
| 4,804,520 | 2/1989 | Richtenburg et al. | 422/211 X |

FOREIGN PATENT DOCUMENTS

| | | |
|---|---|---|
| 2336363 | 1/1974 | Fed. Rep. of Germany . |
| 3123872 | 1/1982 | Fed. Rep. of Germany . |
| 0859764 | 9/1981 | U.S.S.R. . |
| 2135242 | 8/1984 | United Kingdom . |

*Primary Examiner*—Richard L. Chiesa

*Attorney, Agent, or Firm*—Sughrue, Mion, Zinn, Macpeak & Seas

[57] ABSTRACT

A developer treatment apparatus for treating excess developer remaining after film has been developed by developer containing a pigment dispersed in a solvent composed of a hydrocarbon as a main component includes a catalyst for oxidizing the hydrocarbon contained in the excess developer, thus treating the excess developer easily.

15 Claims, 22 Drawing Sheets

DEVELOPER TREATMENT APPARATUS

This is a continuation of application Ser. No. 07/287,380 filed Dec. 21, 1988, now abandoned.

BACKGROUND OF THE INVENTION

1. Field of the Invention

The present invention relates to a developer treatment apparatus for treating excess developer which contains a solvent composed of a hydrocarbon as a main component and a pigment dispersed therein and is discharged from a development unit.

2. Description of the Related Art

Apart from the various methods of recording images that make use of silver halides, there are several known methods of recording images including a magnetic method (magnetography), an electrophotographic method and so forth.

In magnetography which is the magnetic method, a magnetic latent image is formed on a drum onto which a recording layer formed from a magnetic substance is applied, and a developer containing a hydrocarbon as a main component is applied to the magnetic latent image so formed, and subsequently the image is developed by a resin toner containing the powder magnetic substance dispersed in the developer applied to be recorded on the recording layer and transferred to a transfer paper to provide a copy.

Electrographic apparatuses are known which employ an electrographic method in which a image is recorded in a given frame of an electrophotographic film and can then be projected or copied.

U.S. Pat. Nos. 4,600,291 and 4,697,912 disclose a process head disposed on such an electrographic apparatus for charging an electrophotographic film, exposure, development thereof or the like.

A process head of the type disclosed in the above-described publications is provided with a charging and exposure unit, a development unit, a drying unit, a fixing unit and so on. These units are disposed in the above-described order in the direction in which the electrophotographic film is conveyed, the interval between these units being represented by a given value which is equal to the frame pitch of the electrophotographic film.

A developer which is stored in a developer tank and contains a hydrocarbon as a main component is supplied to the development unit where the developer is applied to the electrophotographic film. The toner particles which are contained in the developer and electrified to negative polarity therefore adhere to the negative charge formed on the electrophotographic film to form a developed image which is recorded on the electrophotographic film.

The above-described method of magnetography or electrophotography has problems that since excess developer (a solvent composed of a hydrocarbon as a main component in which toner particles are dispersed) remaining after development is returned to the developer tank and reused as a developer, a return pipeline is required to be disposed and the piping is thus complicated.

There is other problem in that, since a developer that has been used for development several times loses its strength, the weak developer must be discarded as waste. This imposes a burdensome need for attention to the time-consuming problems of dealing with waste solution disposal.

In view of the above-described problems, it is an object of the present invention to provide a photographic treatment apparatus which requires no piping for returning a developer to a development tank and is thus able to reduce the amount of time required for disposal of excess developer in the form of a waste solution.

SUMMARY OF THE INVENTION

The present invention provides a developer treatment apparatus for treating waste remaining after development conducted in a photographic treatment apparatus in which the development is effected by using a developer containing a pigment dispersed in a solvent composed of a hydrocarbon as a main component, the developer treatment apparatus comprises a catalytic oxidation means for treating the excess developer remaining after development by oxidizing the hydrocarbon contained in the developer so as to change it into water vapor and carbon dioxide which are then discharged to the atmosphere.

In the present invention, the excess developer remaining after development is treated by oxidation of the hydrocarbon contained in the excess developer by the catalytic oxidation means so as to change the hydrocarbon into water vapor and carbon dioxide which are then discharged to the atmosphere. There is thus no need for the provision of piping for disposal of the excess developer and the time required for dealing with a waste solution can be reduced.

DETAILED DESCRIPTION OF PREFERRED EMBODIMENTS

Figure 3:
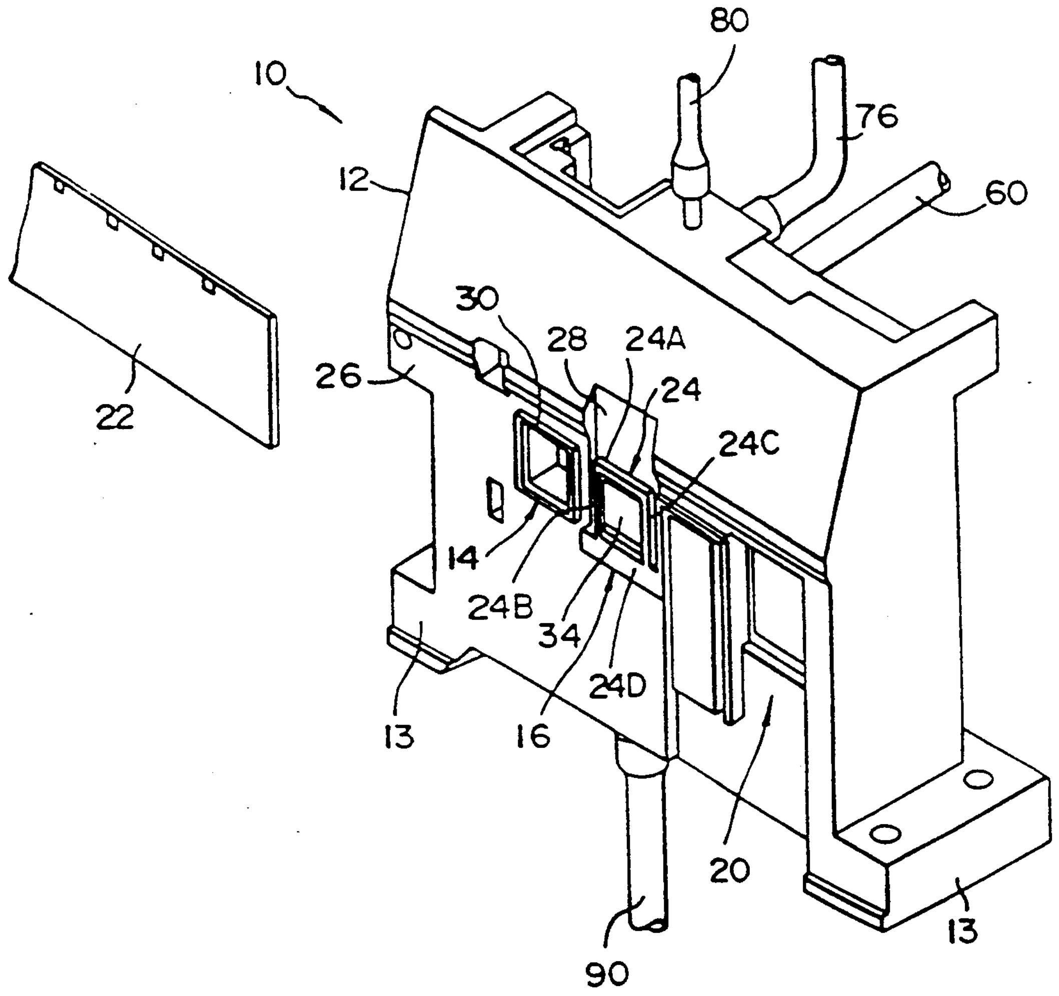
FIG. 3 is a perspective view of the process head in the first embodiment.

FIG. 3 shows a first embodiment of a process head 10 for forming a microfilm image to which the present invention is applied.

As shown in FIG. 3, the process head 10 comprises a body 12 having the relatively flat form of a substantially rectangular parallelepiped and two feet 13 which are integrally formed on a lower portion of the body 12, these members being integrally formed from synthetic resin except for the fittings.

As shown in FIG. 3, a charging and exposure unit 14, a development unit 16, a drying unit 18 and a fixing unit 20 are formed in the body 12 of the process head 10 at given intervals which correspond to the frame pitch, of an electrophotographic film 22.

The portion of the electrophotographic film 22 which is placed in the charging and exposure unit 14 (corresponding to one frame) is electrified and then exposed by being irradiated with the image light of an original. An electrostatic latent image corresponding to the image pattern on the original is therefore formed on the electrophotographic film 22. In the development unit 16, a liquid developer is applied to the electrophotographic film 22 which was exposed in the charging and exposure unit 14 to develop the electrostatic latent image. In the drying unit 18, dry air is blown onto the electro-photographic film 22 that has become wet with the liquid developer so as to remove moisture. In the fixing unit 20, an image is fixed on the electrophotographic film 22 by means of a fixing lamp or the like.

As shown in FIG. 3, the development unit 16 has a mask 24 formed therein, the mask 24 comprising an upper frame 24A and left and right frames 24B and 24C which are all erect on the surface of a concave portion 28 formed on a front wall 26 and a lower frame 24D which has a lower surface rising from the front wall 26. Both ends of the lower frame 24D extend laterally from the connection portions to the left and right frames 24B, 24C. The height of projection of the mask 24 is so determined as to be at the same level as a mask 30 formed in the charging and exposure unit 14.

The width of an opening of the mask 24 is so set as to be slightly less than the opening width of the opening of the mask 30. The height of the opening of the mask 24, i.e., the distance between the internal walls of the upper frame 24A and the lower frame 24D, is greater than the height of the opening of the mask 30 because the internal wall of the lower frame 24D is placed below that of the mask 30.

Figure 1:
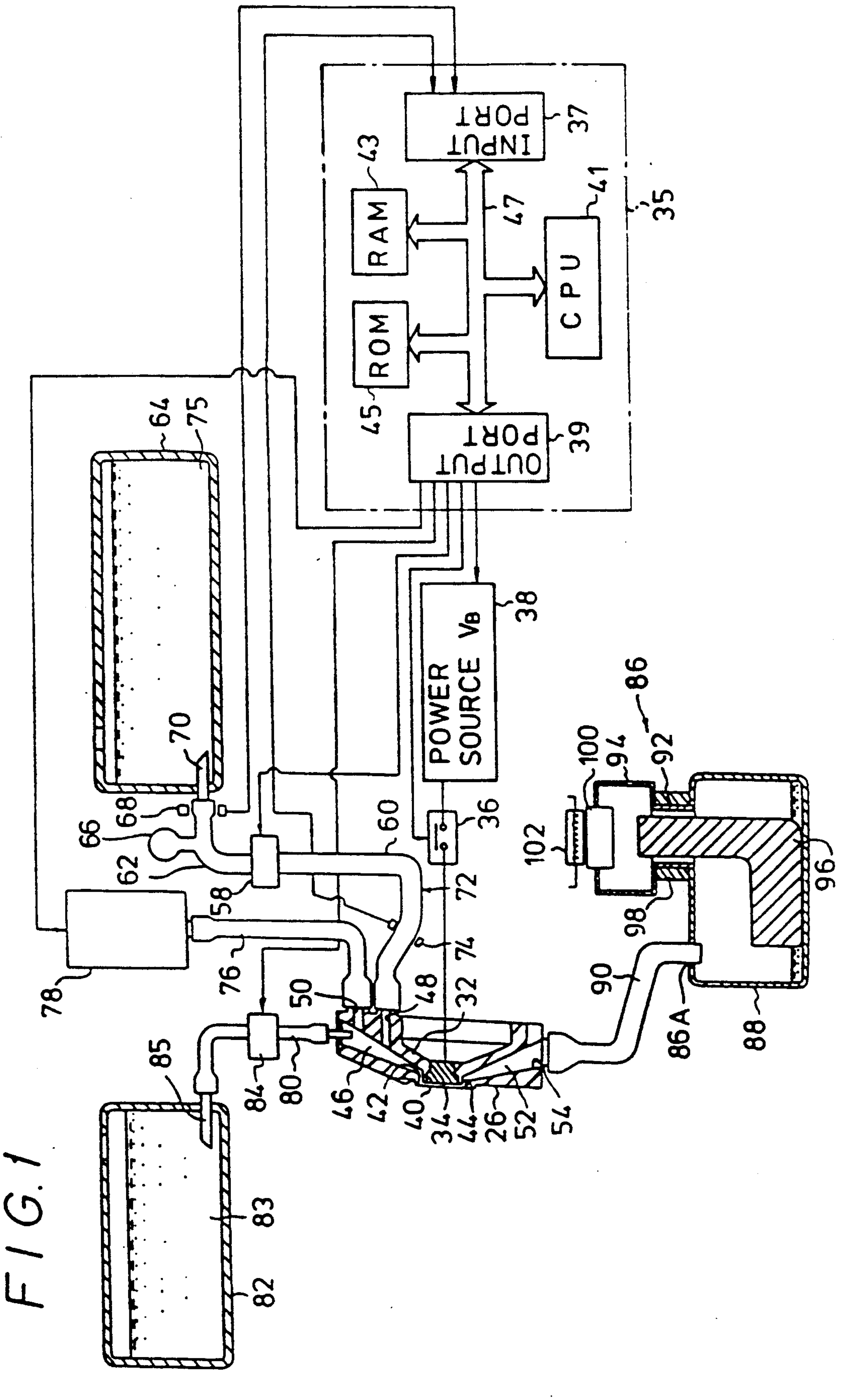
FIG. 1 is a sectional view of a first embodiment which shows the relationship between the development unit of a process head to which the present invention is applied and other apparatuses.

As shown in FIG. 1, a development electrode 34 is so disposed in the opening of the mask 24 as to be supported by a back wall 32. The development electrode 34 is connected to a bias power source 38 through a relay contact point 36. The relay contact point 36 is generally in a closed state so that a bias voltage is applied to the development electrode 34. When the relay contact point 36 is opened, the bias voltage is shut off. The relay contact point 36 and the bias power source 38 are connected to a control circuit 35. As shown in FIG. 1, this control circuit 35 comprises CPU 41, RAM 43, ROM 45, an input port 37 and an output port 39 which are connected to each other by a data bus 47.

The surface of the development electrode 34 is placed at a position slightly behind the end surface of the mask 24 so that the space between the development electrode 34 and the internal wall of the mask 24 serves as a development chamber 40. Upper and lower portions of the development electrode 34 are opened so as to respectively serve as a developer and squeeze air flow inlet 42 and a developer and squeeze air flow outlet 44.

The developer and squeeze air flow inlet 42 is made to communicate with a passage 46 which is formed by an internal space in the process head 10. The passage 46 is made to communicate with a developer supply port 48 which opens onto the back of the process head 10 and a squeeze air supply port 50. The developer and squeeze air flow outlet 44 is made to communicate with a passage 52 which is formed by an internal space in the process head 10. The passage 52 is made to communicate with a developer and squeeze air exhaust port 54 which opens onto the lower surface of the process head 10.

As shown in FIG. 1, the developer supply portion 48 is connected to a developer tank 64 by way of pipelines 60 and 62 through a solenoid valve 58 which is disposed at an intermediate position along the pipelines. The developer tank 64 is placed above the solenoid valve 58. The end of the pipeline 62 is provided with a liquid extraction needle 70 which is inserted into a lower portion in the side wall of the developer tank 64 so that the pipeline 62 communicates with the developer tank 64. Each of the pipelines 60 and 62 has a diameter of 0.8 to 1.5 mm.

A known air holding portion 66 for removing bubbles which is generally provided in a drip tube is disposed at an intermediate position along the pipeline 62. A first liquid detector 68 is interposed between the development tank 64 and the air holding portion 66 in the pipeline 62. This first liquid detector 68 detects the presence of the developer 75 in the developer tank 64 by detecting the presence of the toner particles contained in the developer 75 in the pipeline 62. This first liquid detector 68 is connected to the input port 37 of the control circuit 35.

One end of the pipeline 60 is connected to the solenoid valve 58 and extends downwardly in the vertical direction from that end, an intermediate portion thereof being bent substantially at a right angle to provide a bent portion, and the other end communicating with the developer supply port 48.

A remaining developer portion 72 is provided in a portion of the pipeline 60 which is below the developer supply port 48 and between the bent portion of the pipeline 60 and the developer supply port 48.

A second liquid detector 74 is disposed on the pipeline 62 between the remaining developer portion 72 and the developer supply port 48. The second liquid detector 74 detects the flow of toner particles contained in the developer 75 passing through the pipeline 60, i.e., detects the flow of developer 75 in the pipeline 60. This second liquid detector 74 is connected to the input port 37 of the control circuit 35.

The squeeze air supply port 50 is connected to a pressure squeeze air pump 78 by way of a pipeline 76.

The passage 46 communicates with a rinsing bottle 82 through a pipeline 80 that passes through the upper surface of the body 12. A rinsing liquid solenoid 84 is disposed at an intermediate position along the pipeline 80. This rinsing liquid solenoid 84 is connected to the output port 39 of the control circuit 35. One end of the pipeline 80 is provided with a liquid extraction needle 85 which is inserted into the side wall of the rinsing bottle 82 in the same way as in the pipeline 62 so that the rinsing bottle communicates with the passage 46. The rinsing liquid bottle 82 receives a rinsing liquid 83, for example, ISOPER G (trade name, produced by Esso Co., Ltd.) which is a solvent component of the developer.

A development waste disposal apparatus 86 is provided below the developer and squeeze air exhaust port 54.

Figure 2:
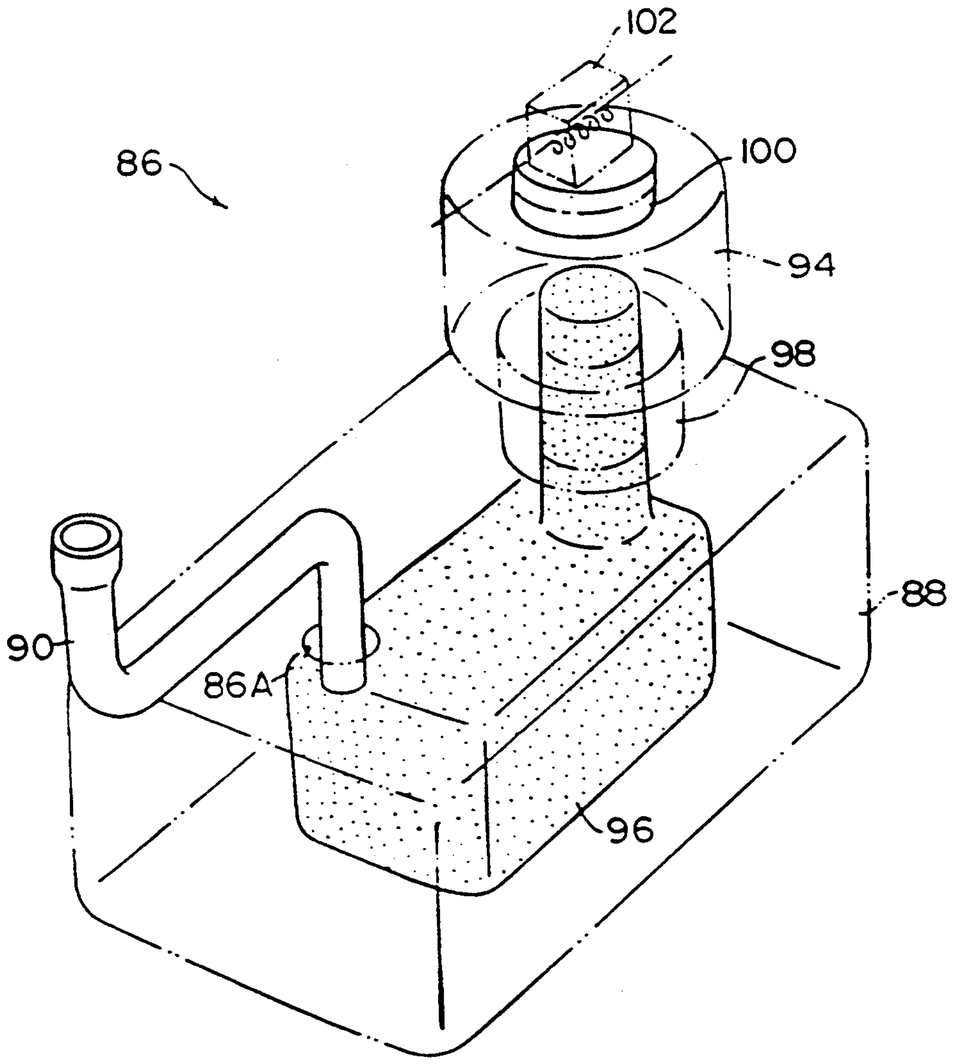
FIG. 2 is a perspective view of a developer treatment apparatus in the first embodiment.

As shown in FIGS. 1 and 2, the development waste disposal apparatus 86 is provided with a waste tank 88 which has a through hole 86A provided in a side of the upper surface of the waste tank 88. One end of a pipeline 90 is inserted into the through hole 86A, the other end thereof communicating with the developer and squeeze air exhaust port 54. The excess developer is discharged to the development waste disposal apparatus 86 from the the developer and squeeze air exhaust port 54.

A cylindrical pipe 92 is provided on the upper surface of the waste tank 88 so as to stand erect thereon. A cylindrical vaporization tank 94 having a larger diameter than that of the pipe 92 is connected to one end of the latter. The waste tank 88 is thus made to communicate with the vaporization tank 94 through the pipe 92.

A liquid absorbing cotton 96 is received in the waste tank 88, with one end thereof being upwardly extended, passed through the pipe 92 and inserted into the vaporization tank 94. The liquid absorbing cotton 96 enables the excess developer discharged into the waste tank 88 to be sucked up by the end inserted into the pipe 92 and to be vaporized in the vaporization tank 94 from the end.

A catalyst 100 which serves as a catalytic oxidation means is provided on the upper surface of the vaporization tank 94 such as to be partially housed therein. A heater 102 is provided on the catalyst 100 for igniting the catalyst 100.

The excess developer vaporized in the vaporization tank 94 from the end of the liquid absorbing cotton 96 is therefore oxidized by the catalyst 100. In this case, the catalyst 100 is first ignited by the heater 102 in order to oxidize the excess developer that has vaporized. After the catalyst has been ignited, oxidation proceeds during vaporization of the excess developer so as to change the excess developer into carbon dioxide and water vapor which are then discharged to the atmosphere from the upper surface of the catalyst 100. A thermal insulator 98 is also provided around the periphery of the pipe 92 so as to prevent any decrease in the temperature of the end of the liquid absorbing cotton 96 once the catalyst has been ignited.

A presser plate is disposed in front of the front wall 26 of the process head 10 and is driven by a film pressure mechanism (not shown) so as to press the electrophotographic film 22 against the front wall 26 of the process head 10. In this case, the frames of the electrophotographic film 22 so pressed are respectively placed in contact with the charging and exposure unit 14, the development unit 16, the drying unit 18 and the fixing unit 20.

Description will now be given of the function of this embodiment.

The respective frames of the electrophotographic film 22 are respectively sent to the charging and exposure unit 14, the development unit 16, the drying unit 18 and the fixing unit 20, in that order, and are treated in the units so that a picture image is recorded on the electrophotographic film 22.

In this case, a film moving motor (not shown) is driven so as to move a given frame which is freely selected from the frames having no recorded image to the front of the mask 30 of the charging and exposure unit 14. This operation is performed by specifying a given frame using a control keyboard (not shown) for operating an electrophotographic apparatus in which the process head 10 is incorporated.

With respect to this given frame, description will now be given with reference to FIGS. 4(A) and 4(B) of a case in which the given frame is sent to the charging and exposure unit 14, the development unit 16, the drying unit 18 and the fixing unit 20 in turn for recording of an image.

The given frame which is freely selected from all the frames having no image recorded thereon is placed in the charging and exposure unit 14 and is electrified therein and exposed to form an electrostatic latent image. Judgement is made in Step 200 as to whether or not the charging and exposure have been completed. If the charging and exposure are not yet completed, this step is repeated.

When the charging and exposure have been completed to form an electrostatic latent image on the electrophotographic film 22, the film pressure effected by the presser is removed, and the film moving motor (not shown) is operated (Steps 202, 204). As a result, the given frame in which the electrostatic latent image is formed is moved from the charging and exposure unit 14. This movement enables judgement to be made in Step 206 as to whether or not the given frame has been moved to the development unit 16. In this case, the length of movement of the electrophotographic film 22 is determined by counting blip markers (not shown) which are formed at a given interval on the electrophotographic film 22 so that judgement can be made as to whether or not the given frame has been placed in the development unit 16. If the given frame has not been placed in the development unit 16, the operation of the film moving motor is continued, and, when the given frame is placed in the development unit 16, the operation of the film moving motor is stopped (Step 208).

Figure 4A:
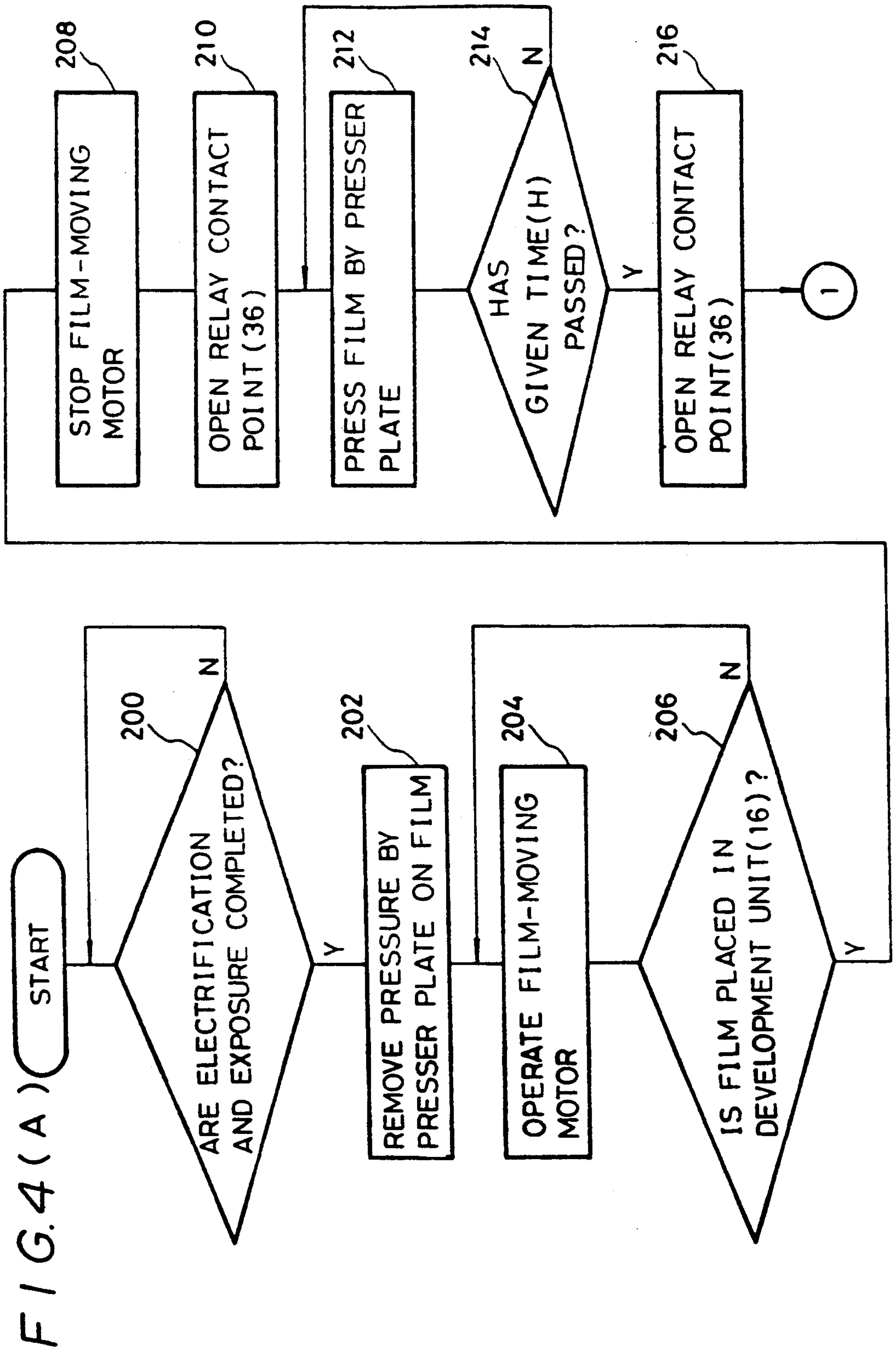
FIGS. 4 (A) and 4 (B) are flow charts showing the function of the development unit in the first embodiment.
Figure 4B:
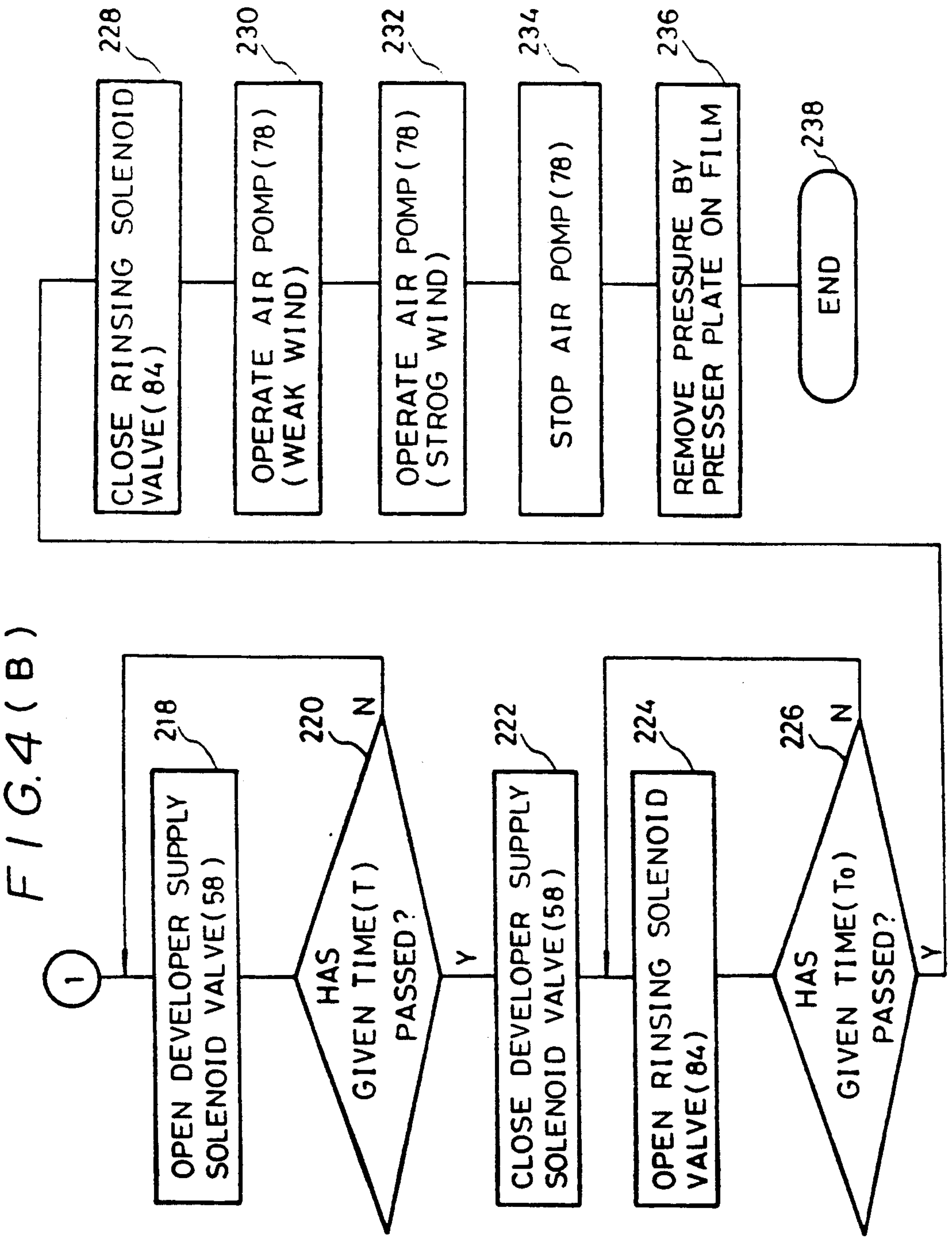

As shown in FIGS. 4(A) and 4(B), the relay contact point 36 in the normal closed state is brought into the open state before the presser is operated so as to stop the application of a bias voltage to the development electrode 34 (Step 210). When the film moving motor is stopped, the presser is operated to bring the electrophotographic film 22 into pressure contact with the development chamber 40 (Step 212). A given time H, during which the application of the bias voltage is stopped, is set to about 30 msec which is the time required for damping the vibrations produced when the electrophotographic film 22 is pressed against the mask 24 of the process head 10 by the presser. This has the effect of preventing the electrophotographic film 22 from coming too close to the development electrode 34 due to carelessness and thus preventing any occurrence of discharge between the electrophotographic film 22 and the development electrode 34. The relay contact point 36 assumes the open state within the given time H, and it assumes the closed state after passage of the given time H (Step 216). The bias voltage is therefore again applied to the development electrode 34.

After the electrophotographic film 22 has been brought into pressure contact with the development chamber 40, the developer supply solenoid valve 58 is opened for a given time T (Steps 218, 220). When the solenoid valve 58 is opened, the developer 75 in the developer tank 64 spontaneously flows down through the pipelines 62, 60 to the process head 10 in which the developer 75 flows into the development chamber 40 from the developer and squeeze air flow inlet 42.

In the case of a first development, since no developer is present in the pipeline 60 or the developer residence portion 72, the time that is allowed to lapse until the solenoid valve 58 is opened must be extended by the time it takes to fill the pipeline 60 and the developer residence portion 72 with the developer. The developer residence portion 72 is provided with a chargeable type of second liquid detector 74 which detects the presence of the developer in the pipeline 60. In the case of the first development, the solenoid valve 58 is opened after passage of the give time T from the detection of the developer by the second liquid detector 74, so insufficient development owing to a delay thereby is prevented. The supply of developer 75 allows the toner particles which are dispersed in the developer and which are electrified to the negative polarity to adhere to the portions of the electrophotographic film electrified to the positive polarity so as to develop the static latent image. The excess developer 75 which is supplied to the development chamber 40 and which flows down therethrough is passed through the developer and squeeze air flow outlet 44, the pipeline 52, the developer and squeeze air exhaust port 54 and the pipeline 90 to be expelled into the waste tank 88.

The excess developer 75 discharged to the waste tank 88 is absorbed by the end of the liquid absorbing cotton 96 and then vaporized into the vaporization tank 94 from the end of the cotton 96. The vaporized excess developer is oxidized when it passes through the catalyst 100. At this time, the catalyst 100 is heated by the heater 102 for the purpose of igniting the catalyst so that it is heated to a temperature at which it is able to satisfactorily exhibit its catalytic function.

Since the components of the vaporized excess developer comprise the products of vaporization of a solvent composed of a hydrocarbon ($C_nH_m$) as a main component, these components are changed into carbon dioxide ($nCO_2$) and water vapor ($m/2H_2O$) by oxidation with the catalyst 100 and are then discharged to the air. The solvent (for example, ISOPER G produced by Esso Co., Ltd.) which is the solvent component of the excess developer and which is composed of a hydrocarbon as a main component is consequently disposed of.

The toner particles contained in the excess developer 75 are caused to stay at the end of the liquid absorbing cotton 96. The amount of toner particles kept here corresponds to the amount of developer used for development and is thus very small. The toner particles can therefore be disposed of by regularly exchanging or cleaning the liquid absorbing cotton 96.

The catalyst igniting heater 102 for heating the catalyst 100 to a temperature at which the catalyst 100 function is stopped after the oxidation has been started by igniting the catalyst 100. This is because, once the function of the catalyst 100 has started, it generates heat by oxidation and the catalytic function is maintained by the heat generated. The catalyst 100 therefore continuously functions during the time the excess developer is vaporized from the end of the liquid absorbing cotton 96, and supplied to the catalyst 100.

In this way, the excess developer 75 is treated by being changed into carbon dioxide and water vapor and discharged to the air.

The solenoid valve 58 is closed in Step 222 after the passage of the give time T from the time the solenoid valve 58 was opened.

The rinsing solenoid valve 84 is opened for a given time $T_0$ in Steps 224, 226 after the solenoid valve 58 has been closed. The opening of the rinsing solenoid valve 84 causes the rinsing solution 83 in the rinsing solution bottle 82 to be supplied to the development chamber 40. The excess developer adhering to the inside of the development electrode 34 is washed with the rinsing solution 83 and is then discharged to the waste tank 88 together with the rinsing solution 83. The rinsing solution 83 and the excess developer which are discharged into the waste tank 88 are vaporized from the end of the liquid absorbing cotton 96, passed through the catalyst 100 where they are changed into carbon dioxide and water vapor, and then discharged to the atmosphere.

The rinsing solenoid valve 84 is closed after passage of the give time $T_0$ from the time the rinsing solenoid valve 84 was opened (Step 228). The squeeze air pump 78 shown in FIG. 1 is operated at the same time as the rinsing solenoid valve is closed so as to supply pressurized air to the development chamber 40 from the squeeze air supply port 50 (Steps 230, 232). Since the excess developer 75 adhering to the electrophotographic film 22 is thus blown off from the film 22, no developer remains on the film 22. The developer 75 blown off in this way is discharged to the waste tank 77.

The pressurized air is supplied as a weak wind to the development chamber 40 during the time a sufficient amount of developer remains in the development chamber 40 (Step 230) so as to prevent any deterioration of the quality of the image owing to rapid blowing off. The pressurized air is supplied as a high wind after passage of a given time from the time the supply of air was started. The supply of pressurized air is suspended when the operation of the air pump 78 is stopped (Step 234) so that the pressure on the film effected by the presser is removed (Step 236), leading to the completion of the development in the development unit 16 (Step 238).

The electrophotographic film 22 is then moved for one frame by being driven by the film moving motor so that the given one frame which was placed in the development unit 16 is moved to the drying unit 18. After the film moving motor has been stopped, the presser is operated to bring the film 22 into pressure contact with the drying unit 18. After a given time has been passed, hot air is blown into the drying unit 18 to dry the developer 75.

After the pressure of the film by the presser has been removed, the film moving motor is driven to move the frame which was placed in the drying unit 18 to the fixing unit 20. After the driving of the film moving motor has been stopped, the presser is operated by the film pressure mechanism to bring the film into pressure contact with the fixing unit 20 to which cold air is then supplied.

After the passage of a given time from the operation of the film pressure mechanism, a xenon lamp (not shown) is flashed to fuse and fix the toner particles to the surface of the electrophotographic film 22, leading to the completion of the fixing process.

The image is completely recorded on the electrophotographic film 22 by completing the above-described process.

In the stage where all the treatments are completed, the pipelines 62, 60 and the developer residence portion 72 between the developer tank 64 and the developer supply port 48 are filled with the toner solution.

The long-term stay of the toner solution in the pipelines is undesirable because the toner particles dispersed in the solution settle in the pipelines and thus produce non-uniformity in the concentration of the toner in the pipelines.

The presser is therefore pressed against the front of the process head 10 after all the operations have been completed, and the solenoid valve 58 is then opened for 2 to 3 seconds after the air pump 78 has been activated. These operations cause the developer remaining in the developer supply port 48, the pipelines 60, 62 and the developer residence portion 72 to be returned to the developer tank 64. The solenoid valve 58 is then closed and the air pump is stopped, as well as the pressure by the presser being removed.

It is known that settling occurs in the developer tank 64 in a smaller degree than in the pipelines. It is also possible to completely prevent settling by using a certain agitation means (not shown).

Although the developer which cannot be extracted from the pipelines by this operation remains in the pipelines, in this embodiment, the remaining developer stays in the remaining developer portion 72 which is provided in a place below any one of the other members. Since the remaining developer portion 72 is connected to the developer supply port 48 through a capillary tube having a diameter of 0.8 to 1.5 mm, substantially no evaporation of the developer takes place therein. There is therefore no problem, if the developer remains in the portion 72, the developer is dried or solidified, with the piping being plugged.

Figure 5:
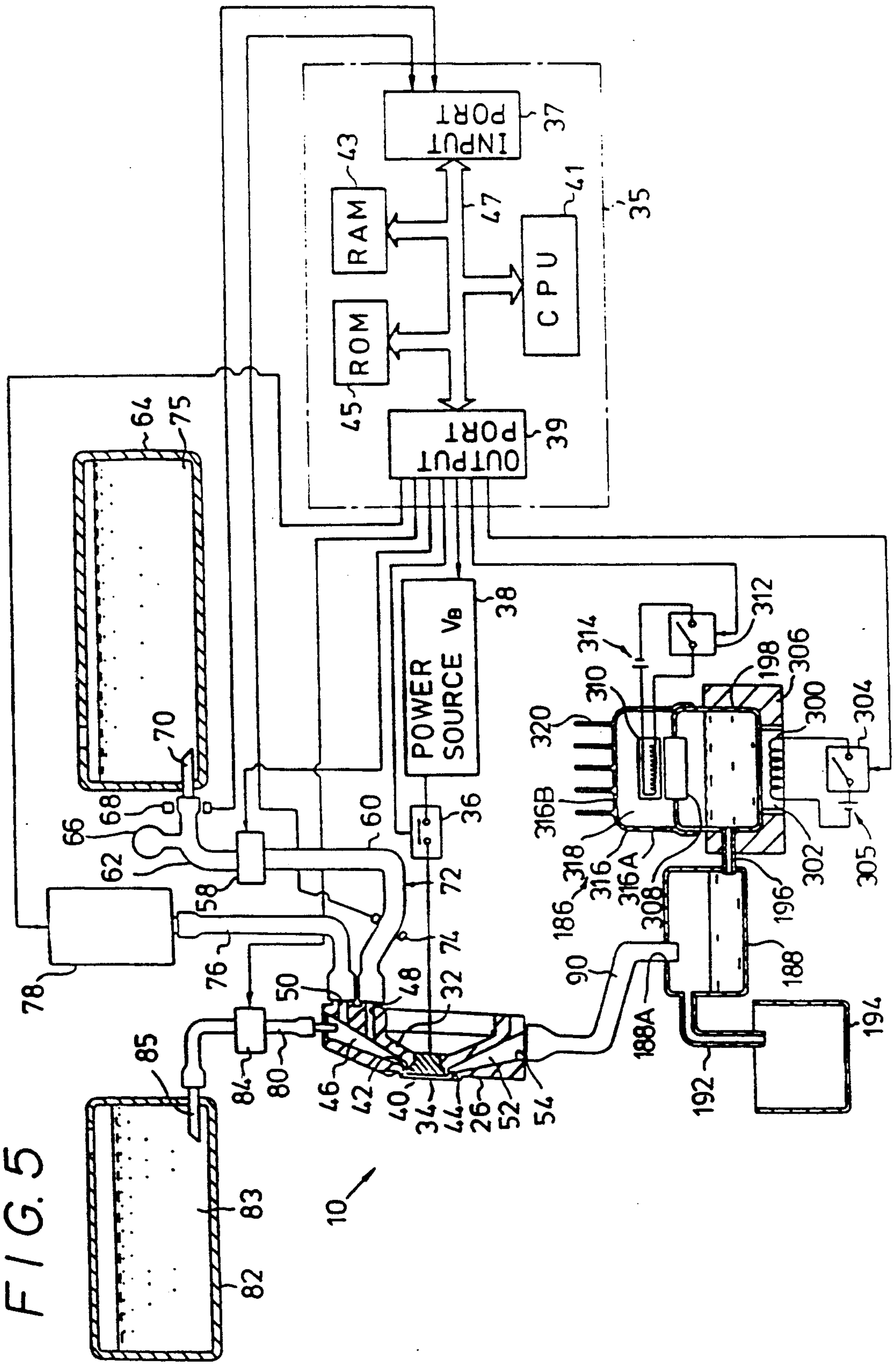
FIG. 5 is a sectional view of a second embodiment which shows the relationship between the development unit of a process head to which the present invention is applied and the other apparatuses.
Figure 6:
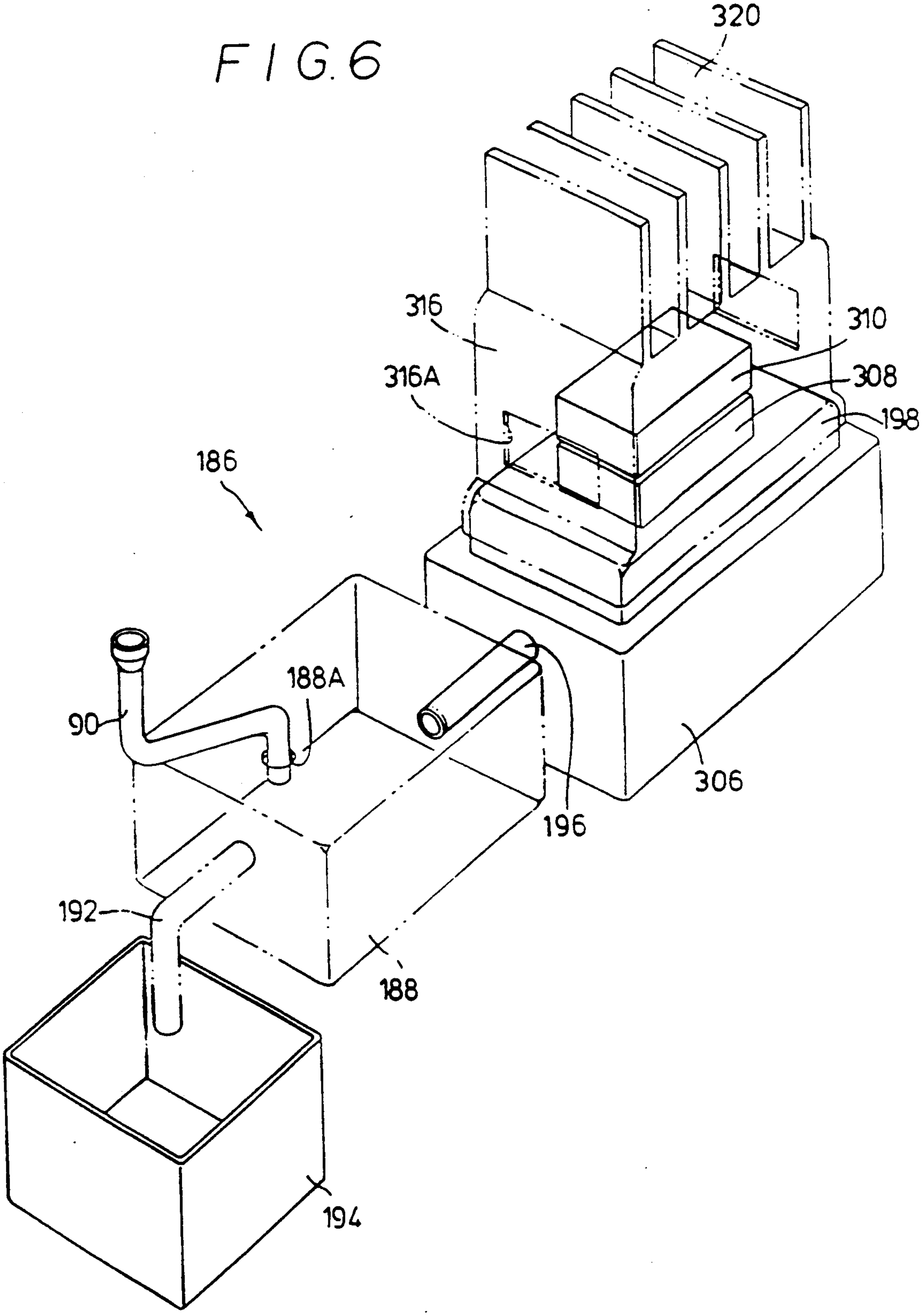
FIG. 6 is a perspective view of a developer treatment apparatus in the second embodiment.
Figure 7:
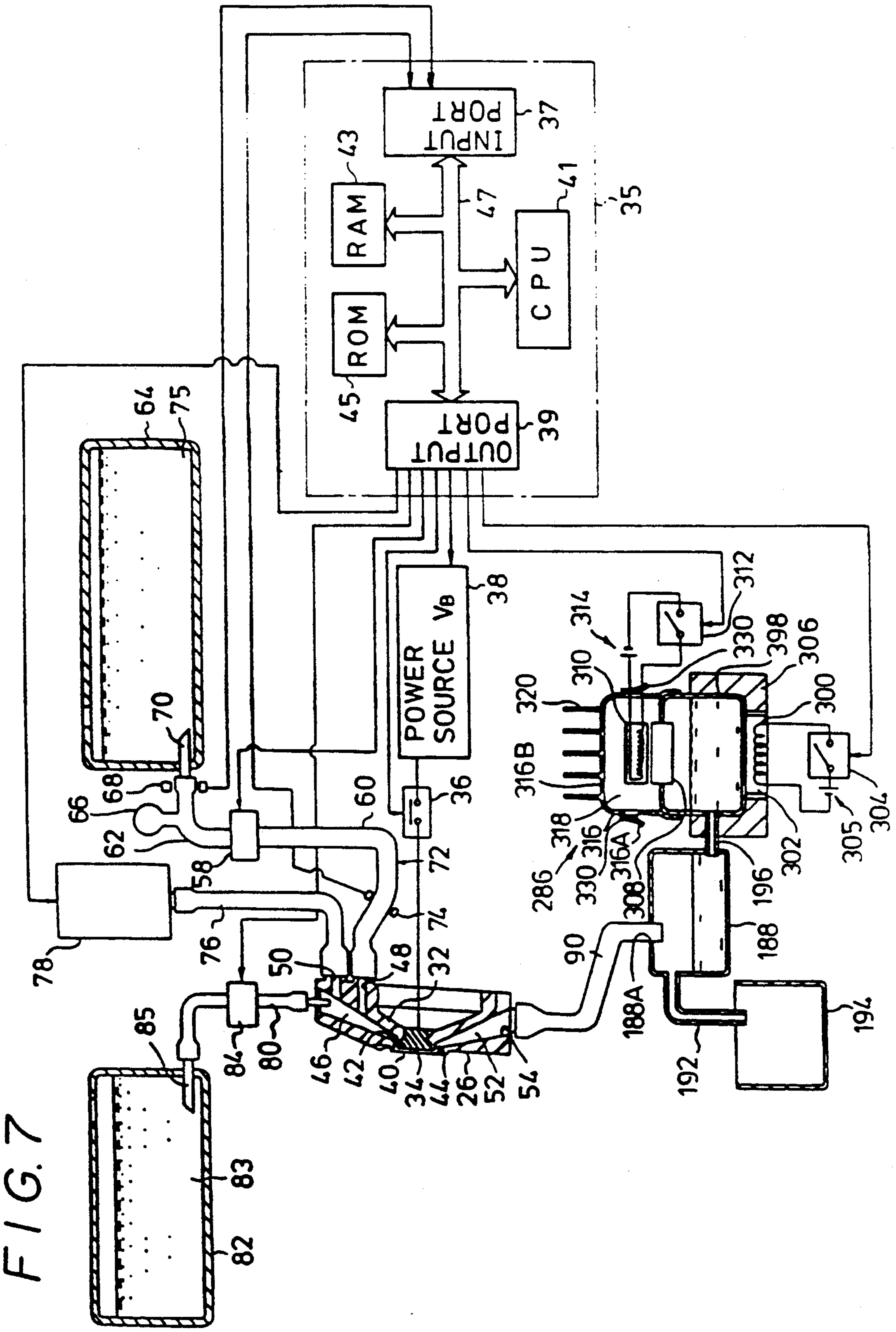
FIG. 7 is a sectional view of a third embodiment which shows the relationship between the development unit of a process head to which the present invention is applied and the other apparatuses.
Figure 8:
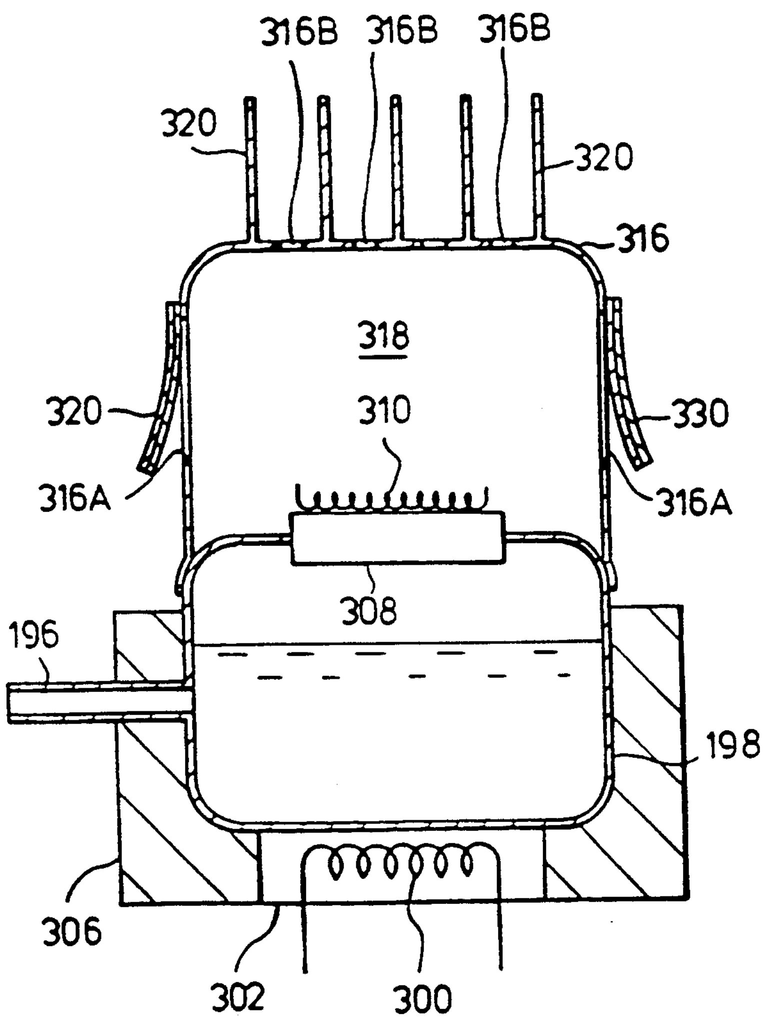
FIG. 8 is a sectional view of a combustion tank in the third embodiment.
Figure 9:
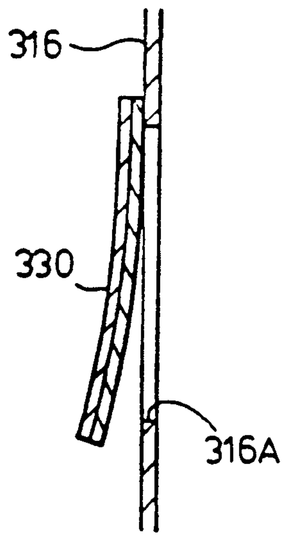
FIG. 9 is an enlarged view of a principal portion of the combustion tank shown in FIG. 8.

Description will now be given of a second embodiment with reference to FIGS. 5 and 6.

In this embodiment, the same parts, members and units and the like as those of the first embodiment are denoted by the same reference numerals and thus not described below.

This embodiment is different from the first embodiment in the structure of a developer treatment apparatus which is disposed below the developer and squeeze air exhaust port 54.

The developer treatment apparatus used in this embodiment is provided with a waste tank 188. The waste tank 188 has a through hole 188A which is provided in the upper surface thereof and into which one end of the pipeline 90 is inserted. The end of the pipeline 90 is made to communicate with the developer and squeeze air exhaust port 54 so as to discharge the excess developer passing through the pipeline 90 to the waste tank 188 after development.

One end of a pipeline 192 is made to communicate with an upper portion of the side wall of the waste tank 188, with an intermediate portion being downwardly bent substantially at a right angle and the other end being opened into an overflow liquid recovery tank 194. The excess developer discharged to the waste tank 188 overflows and is exhausted into the overflow liquid recovery tank 194. Although no developer overflows during ordinary use of he apparatus, if a large amount of electrophotographic film is continuously developed, since all the excess developer cannot be received in the waste tank 188, the excess developer of an amount over a given amount (the volume of the waste tank 188) overflows from the pipeline 192 and is recovered by the overflow liquid recovery tank 194.

The waste tank 188 has the side wall which is opposite to the side wall communicating with the pipeline 192 and in which a lower portion is made to communicate with a combustion tank 198 through a pipeline 196 so that the excess developer discharged to the waste tank 188 is supplied to the combustion tank 198. The combustion tank 198 is made of a metal such as stainless steel or the like.

A heater 300 is disposed as a heating means under the bottom of the combustion tank 198. The heater 300 is received in a stainless container 302 having a wall thickness of about 0.5 mm and is so formed as to have a flat upper surface so that heat can be easily transferred to the bottom of the combustion tank 198. The heater 300 is connected to a power source 305 through a relay contact point 304 interposed therebetween. The relay contact point 304 is connected to the output port 39 of the control circuit 35. The heater 300 is operated with a heater capacity of about 40 W for about 30 seconds when a small combustion tank is used, and the heater 300 is operated with a heater capacity of about 200 W for about 2 minutes when a large combustion tank is used so that the excess developer in the combustion tank 198 can be vaporized by heating. The size of a small combustion tank 198 is $30\times30\times20$ mm and the size of a large combustion tank 198 is about $100\times100\times50$ mm.

A heat insulator 306 is disposed at the bottom and around the side walls of the combustion tank 198 so as to prevent the temperature from lowering in the combustion tank 198.

A catalyst 308 (for example, a platinum group catalyst or a nickel or chromium catalyst) is fixed to the upper surface of the combustion tank 198 in such a manner that its lower surface is exposed to the inside of the combustion tank 198 and its upper surface is exposed to the outside thereof. The solvent contained in the excess developer which was vaporized in the combustion tank 198 is supplied to the catalyst 308. A catalyst igniting heater 310 (for example, composed of a platinum filament) is disposed above the catalyst 308 and is connected to a power source 314 through a relay contact point 312. The relay contact point 312 is connected to the output port 39 of the control circuit 35.

A cover 316 is provided above the combustion tank 198 so as to cover the catalyst 308 and the catalyst igniting heater 310, forming a space serving as an exhaust chamber 318 between the cover 316 and the upper surface of the combustion tank 198. An air intake 316A is provided in the side wall of the cover 316 for the purpose of allowing the inside of the cover 316 to communicate with the outside thereof. Air is therefore introduced into the exhaust chamber 318 and used for oxidizing the catalyst 308.

A plurality of exhaust ports 316B are provided in the upper surface of the cover 316 and five radiation fins 320 are interposed between the respective exhaust ports 316B so as to stand erect on the upper surface. The radiation fins 320 function to reduce the temperature of the cover 316 which rises owing to the heat generated by oxidation of the catalyst 308.

The provision of the radiation fins 320, each comprising substantially a vertical wall above the catalyst 308 can accelerate the ventilation in the vicinity of the catalyst 308 by using a rising current of air and thus enables oxygen to be sufficiently supplied to the catalyst 308, resulting in an increase in the combustion efficiency.

It is therefore preferable that the radiation fins 320 are each made of such a material as aluminum with good radiation properties.

Other members are substantially the same as those of the first embodiment and are thus not described below.

Description will now be given of the function of this embodiment.

The process from the supply of the developer to the development chamber 40 to the exhaust of the excess developer flowing through the pipeline 90 in this embodiment is the same as that in the first embodiment and is thus not described below.

The excess developer 75 discharged to the waste tank 188 while passing through the pipeline 90 is supplied to the combustion tank 198 from the pipeline 196. At the start of the supply of the excess developer 75 to the combustion tank 198, electricity is passed through the catalyst igniting heater 310, as well as the heater 300 being operated, so that the excess developer 75 in the combustion tank 198 is forced to vaporize by heating and supplied to the catalyst 308. The oxidation of the excess developer 75 supplied is started with ignition by the heater 310. Once the catalyst has been ignited, the heater 300 and the catalyst igniting heater 310 are stopped, and the function of the catalyst 308 is maintained by the heat generated by the oxidation of the catalyst 308.

When the excess developer is continuously oxidized while the oxidation of the catalyst proceed, the temperature of the combustion tank 198, the cover 316 and the exhaust chamber 318 rises. The radiation of heat by the radiation fins 320, however, prevents the temperatures from rising too much.

The oxidation of the catalyst 308 causes the solvent $C_nH_m$ (ISOPER G, trade name, produced by Esso Co., Ltd.) which is contained in the developer and is mainly composed of a hydrocarbon to be changed into carbon dioxide ($nCO_2$) and water vapor ($m/2H_2O$), which is then discharged to the air. As a result, the excess developer is disposed off.

As described above, in this embodiment, since the solvent contained in the excess developer is vaporized by heating by the heater 300 and supplied to the catalyst 308, no pigment (toner particles) contained in the excess developer reaches the catalyst 308.

In addition, since the radiation fins 320 are provided on the upper surface of the cover 316, the carbon dioxide and water vapor rise in the exhaust chamber 318 and can thus be discharged to the air from the exhaust ports 316B. The convection current in the exhaust chamber 318 is therefore improved and outside air can be easily introduced into the exhaust chamber 318 from the air intake.

Although the toner particles remain in the combustion tank 198, only a small amount of the toner particles remain and can thus be treated.

Since the carbon dioxide and water vapor discharged are odorless and harmless, there is no adverse effect on the environment.

The temperature of the bottom of the combustion tank 198, i.e, the portion in which the excess developer is received, lowers after the heater 300 has been stopped, but the temperature is raised by the heat generated by the oxidation and is kept by the heat insulator 306.

When all of the excess developer cannot be received in the waste tank 188, the excess developer overflows from the pipeline 192 and is recovered by the overflow liquid recovery tank 194. During the ordinary development, however, the excess developer does not overflow, while in the case of the discharge of a large amount of excess developer, the developer overflows.

The subsequent treatment of the film 22 is the same as that in the first embodiment except for the points described below, and thus is not described in detail below.

The rinsing solution 83 supplied to the development chamber 40 is used for washing away the excess developer adhering to the inside of the development electrode 34 and is then discharged to the waste tank 188 together with the excess developer.

After the rinsing solution 83 and the excess developer have been discharged to the waste tank 188, they are sent to the combustion tank 198, vaporized therein and then passed through the catalyst 308 where they are changed into carbon dioxide and water vapor which are then discharged to the air.

A third embodiment of the present invention is described below with reference to FIGS. 7 to 10.

In this embodiment, the same parts, members and portions as those in the second embodiment are denoted by the same reference numerals and are thus not described below.

A developer treatment apparatus 286 of this embodiment is different from the developer treatment apparatus 186 of the second embodiment in the following points:

One end of a bimetal 330 serving as an air control means is fixed to a portion above the air intake 316A which is formed in the side wall of the cover 316 comprising the exhaust chamber 318. Although the other end of this bimetal 330 is ordinarily separated from the air intake 316A, the bimetal 330 is deformed corresponding to the changes in the temperatures of the cover 316 and the exhaust chamber 318 when the temperatures are increased by the heat generated by the oxidation of the catalyst 308 so that the area of the opening of the air intake 316A can be substantially changed. In other words, when the temperatures are raised by the heat generated, the bimetal 330 is gradually deformed so as to close the air intake 316A, while, when the temperatures are lowered, the bimetal 330 is deformed so as to again open the air intake 316A. The quantity of air which flows into the exhaust chamber 318 through the air intake 316A is therefore changed in correspondence with the deformation of the bimetal 330, i.e., the changes in the temperatures of the cover 316 and the exhaust chamber 318.

The other members are substantially the same as those in the second embodiment and thus are not described below.

Description will now be given of the function of this embodiment.

In this embodiment, the excess developer 75 discharged to the waste tank 188 is supplied to the combustion tank 198 through the pipeline 196 in the same way as in the second embodiment. At the start of the supply of the excess developer 75 to the combustion tank 198, electricity is passed through the catalyst igniting heater 310, as well as the heater 300 being activated, so that the excess developer 75 in the combustion tank 198 is forced to vaporize by heating and then supplied to the catalyst 308. The oxidation of the excess developer 75 supplied is started by ignition by the catalyst igniting heater 310. Once the catalyst has been ignited, the heater 300 and the heater 310 for igniting the catalyst are stopped and the function of the catalyst 308 is maintained by the heat generated by the oxidation of the catalyst 308.

In this embodiment, however, when the excess developer is continuously oxidized while the oxidation of the catalyst proceeds, the temperature in the combustion tank 198, the cover 316 and the exhaust chamber 318 is increased owing to the radiation by the radiation fins 320. At this time, since the bimetal 330 fixed to the air intake 316A of the cover 316 is gradually deformed so as to close the air intake 316A, the area of the opening of the air intake 316A is substantially reduced. The quantity of air which flows into the exhaust chamber 318 through the air intake 316A and is then supplied to the catalyst 308 is therefore reduced, resulting in a decrease in the degree of oxidation of the catalyst 308. The generation of heat is therefore controlled and the temperatures of the combustion tank 198, the cover 316 and the exhaust chamber 318 are thus prevented from excessively rising.

On the other hand, when the temperature is are lowered owing to the decrease in the degree of oxidation of the catalyst 308, the bimetal 330 is deformed in the manner reverse to that described above to substantially increase the area of the opening of the air intake 316A. The quantity of air supplied is thus increased and the oxidation by the catalyst 308 is continued.

As described above, in this embodiment, the quantity of air supplied is controlled by the bimetal 330 serving as an air control means in correspondence with the changes in the temperatures. The oxidation can thus be continued while a given temperature being maintained even if the excess developer is treated for a long time.

The other functions are the same as those in the second embodiment and are thus not described below.

Figure 11:
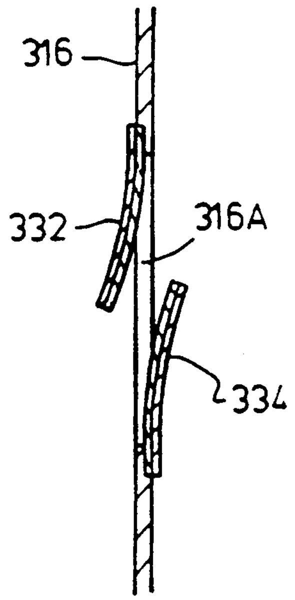
FIG. 11 is a sectional view of a bimetal to which a fourth embodiment relates.
Figure 10:
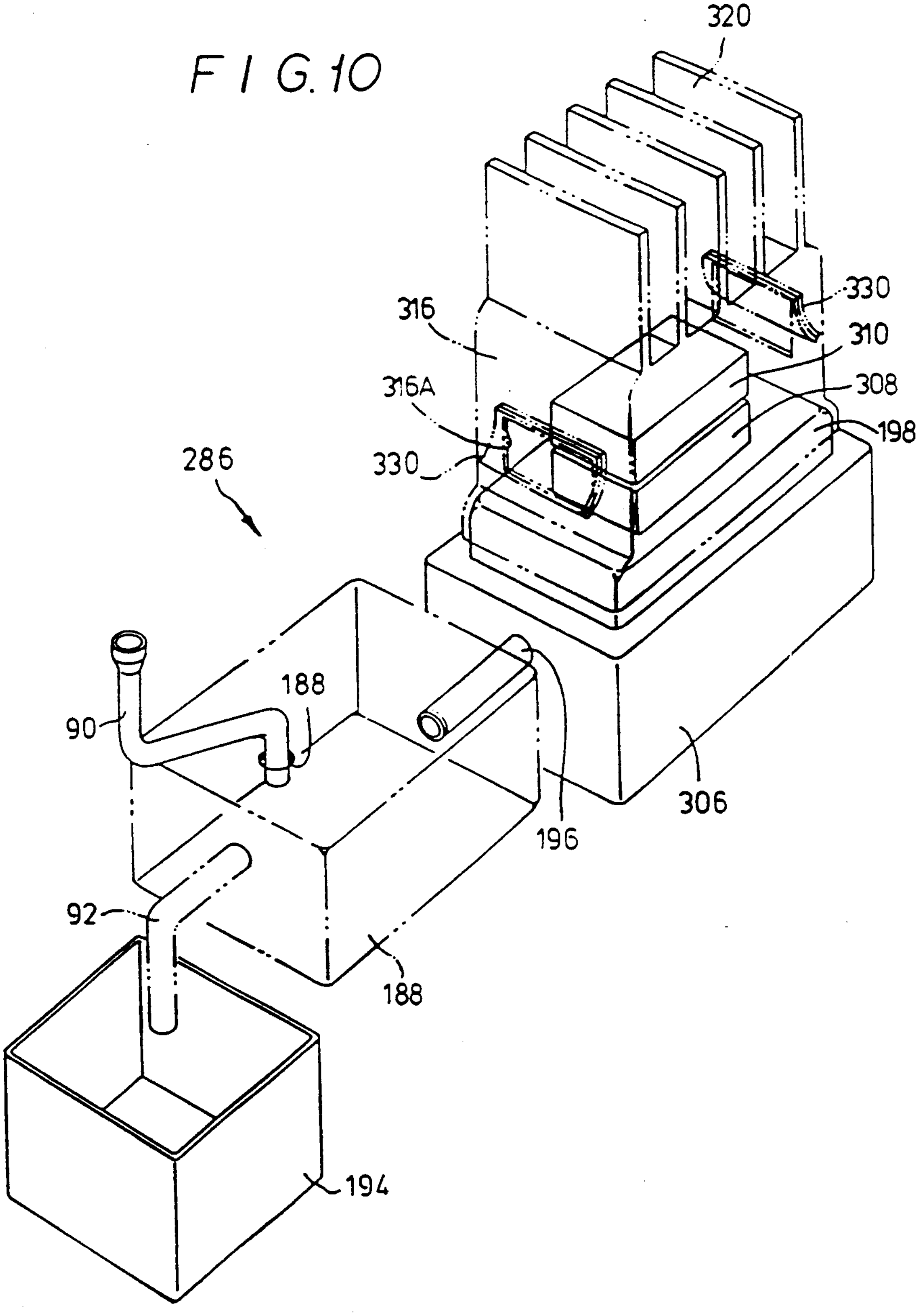
FIG. 10 is a perspective view of a developer treatment apparatus in the third embodiment.

Although this embodiment has a configuration in which the substantial area of the opening of the air intake 316A is changed by using a single bimetal 330, an embodiment alternatively may have a configuration in which two bimetals 332 and 334 are separately fixed to the air intake 316A, as shown in the fourth embodiment shown in FIG. 11, so that the substantial area of the opening is changed by allowing these bimetals to approach or separate from each other in correspondence with the changes in the temperatures.

Figure 12:
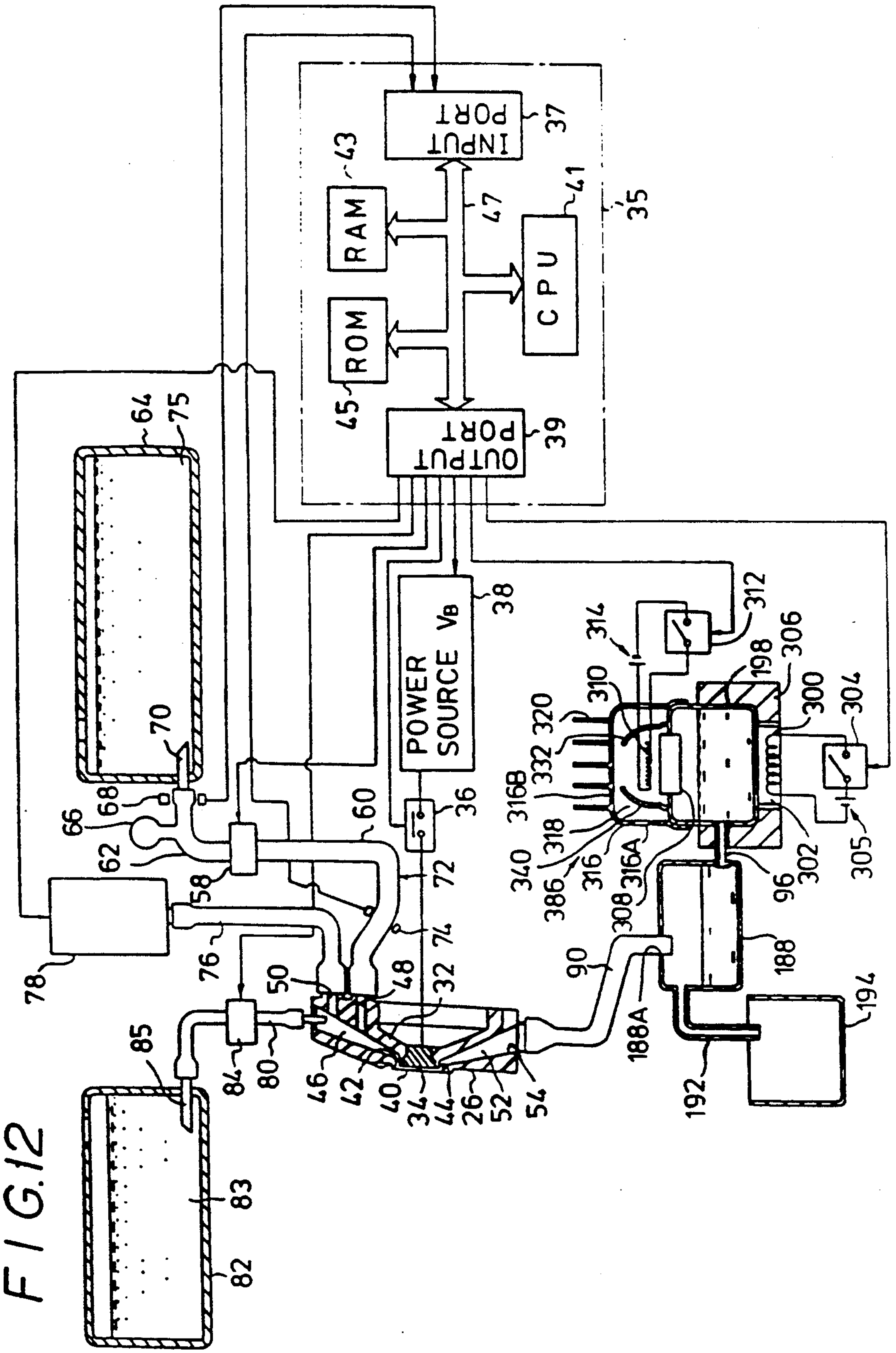
FIG. 12 is a sectional view of a fifth embodiment which shows the relationship between the development unit of a process head to which the present invention is applied and the other apparatuses.
Figure 13:
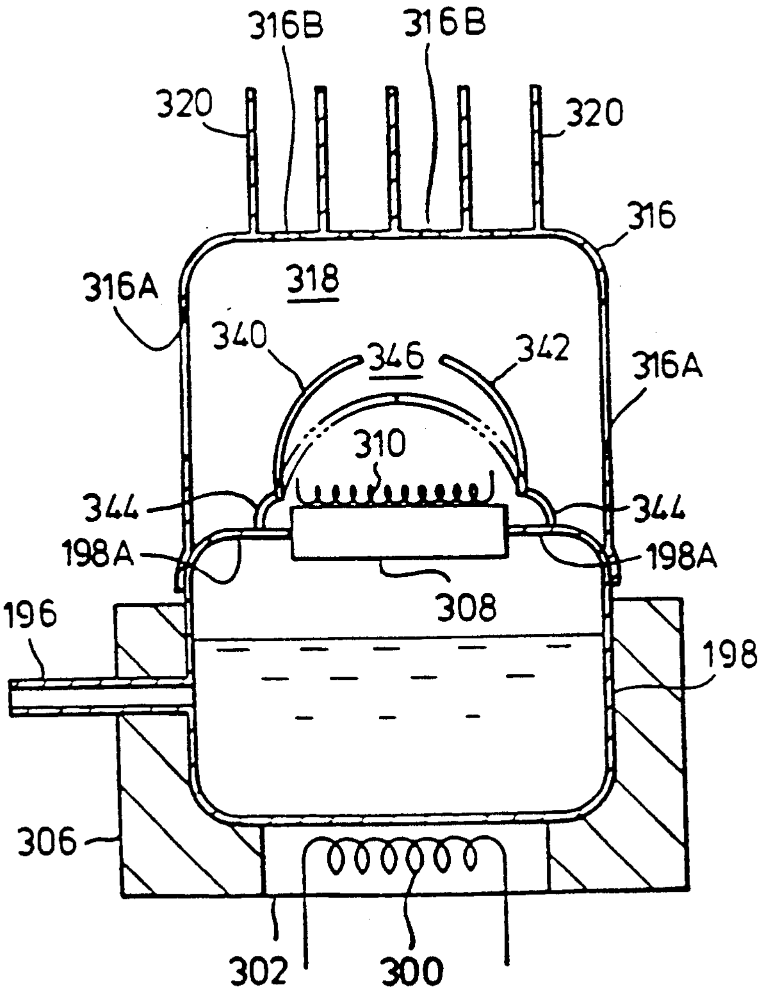
FIG. 13 is a sectional view of a combustion tank in the fifth embodiment.
Figure 14:
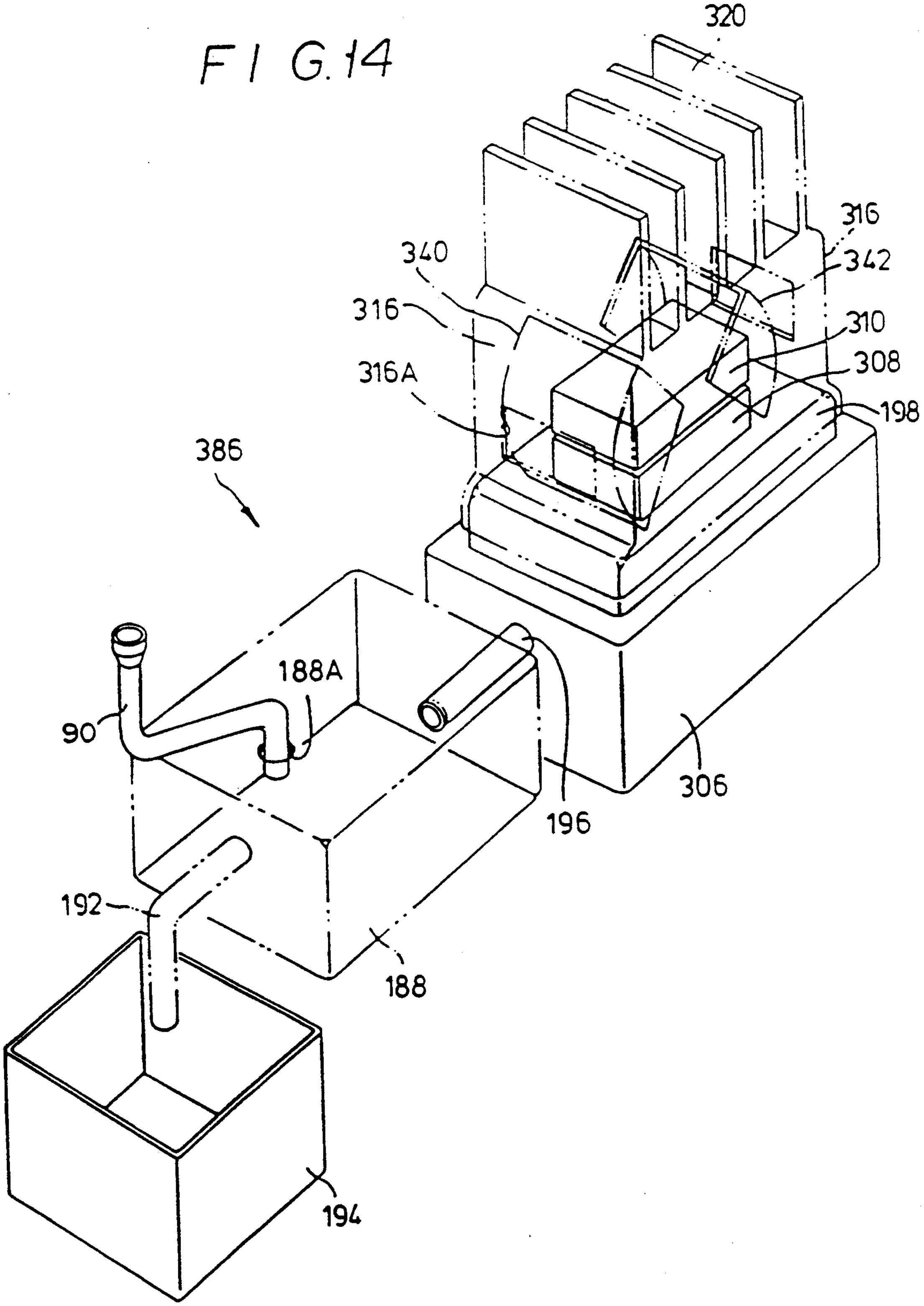
FIG. 14 is a perspective view of a developer treatment apparatus in the fifth embodiment.

A fifth embodiment is described below with reference to FIGS. 12 to 14.

In this embodiment, the same parts, members and portions as those in the second embodiment are denoted by the same reference numerals and thus are not described below.

A developer treatment apparatus 386 in this embodiment is different from the developer treatment apparatus 186 in the second embodiment in the following points:

Two shutters 340, 342 serving as a barrier member are disposed above the catalyst 308 fixed to the upper surface of the combustion tank 198 and the heater 310 disposed above the catalyst 308. The lower ends of these two shutters 340, 342 are separately fixed to the upper wall 198A of the combustion tank 198 by a solder 344 which is an alloy with a low melting point, forming a space serving as an air supply passage 346 therebetween.

The solder 344 is composed of an Sn-Zn alloy with a melting point of about 200° C. If the atmospheric temperature is over this temperature, the solder will therefore melt and thus cause the shutters 340, 342 which are fixed at a given distance to combine with each other, as shown by the two dot chain lines in FIG. 13, the supply passage 346 thereby being closed.

The other members are substantially the same as those in the second embodiment and thus are not described below.

Description will now be given of the function of this embodiment.

In this embodiment, the excess developer 75 discharged to the waste tank 188 is supplied to the combustion tank 198 from the pipeline 196. At the start of the supply of the excess developer 75 to the combustion tank 198, electricity is passed through the catalyst igniting heater 310, as well as the heater 300 being operated, so that the excess developer 75 in the combustion tank 198 is forced to vaporize by heating and then supplied to the catalyst 308. On the other hand, the air required for oxidation flows into the exhaust chamber 318 from the air intake 316A provided in the cover 316 and is then supplied to the catalyst 308 through the supply passage 346 formed by the shutters 340, 342. The oxidation of the excess developer 75 supplied is started by ignition by the heater 310. Once the catalyst has been ignited, the heater 300 and the catalyst igniting heater 310 are stopped, and the function of the catalyst 308 is maintained by the heat generated by the oxidation of the catalyst 308.

When the excess developer is continuously oxidized while the oxidation of the catalyst proceeding, although the temperatures in the combustion tank 198, the cover 316 and the exhaust chamber 318 are raised, the temperatures are not increased too excess because of radiation by the radiation fins 320.

If the temperatures of the catalyst 308 and the cover 316 are excessively raised owing to an abnormal increase in the heat generated by the oxidation (in this embodiment, if the atmospheric temperature is over 200° C.), the solder 344 will melt. The shutters 340, 344 which are fixed at a distance are therefore caused to combine with each other as shown by the two dot chain lines in FIG. 13, the supply passage 346 thereby being closed. The supply of air to the catalyst 308 is therefore stopped, and the oxidation by the catalyst 308 is thus stopped, as well as the generation of heat being stopped. It is therefore possible to prevent the excessive rising of the temperatures of the catalyst 308 and the cover 316 and the occurrence of a problem caused by such excessive rising of the temperatures.

As described above, in this embodiment, the shutters 340, 342 serving as a barrier member are operated by the function of the solder 344 serving as an operational means to shut the supply of air to the catalyst 308 and to stop the oxidation, whereby the temperatures of the catalyst 308 and the cover 316 can be prevented from excessively rising.

The other functions are the same as those of the second embodiment and thus are not described below.

Although this embodiment has a configuration employing as a low-melting point alloy the solder 344 composed of an Sn-Zn alloy with a melting point of 200° C., the low-melting point alloy is not limited to this. Other low-melting point alloys such as Sn-Pb alloys or the like may be used.

Although this embodiment is so configured that the shutters 340, 342 serving as a barrier means are provided right above the catalyst 308 by using the solder 344, an embodiment is not limited to this and may be so configured that an open-close plate serving as a barrier member may be alternatively fixed by a low-melting point alloy to the air intake 316A formed in the cover 316 so as to inhibit the supply (flowing in) of air used for oxidation.

Figure 15:
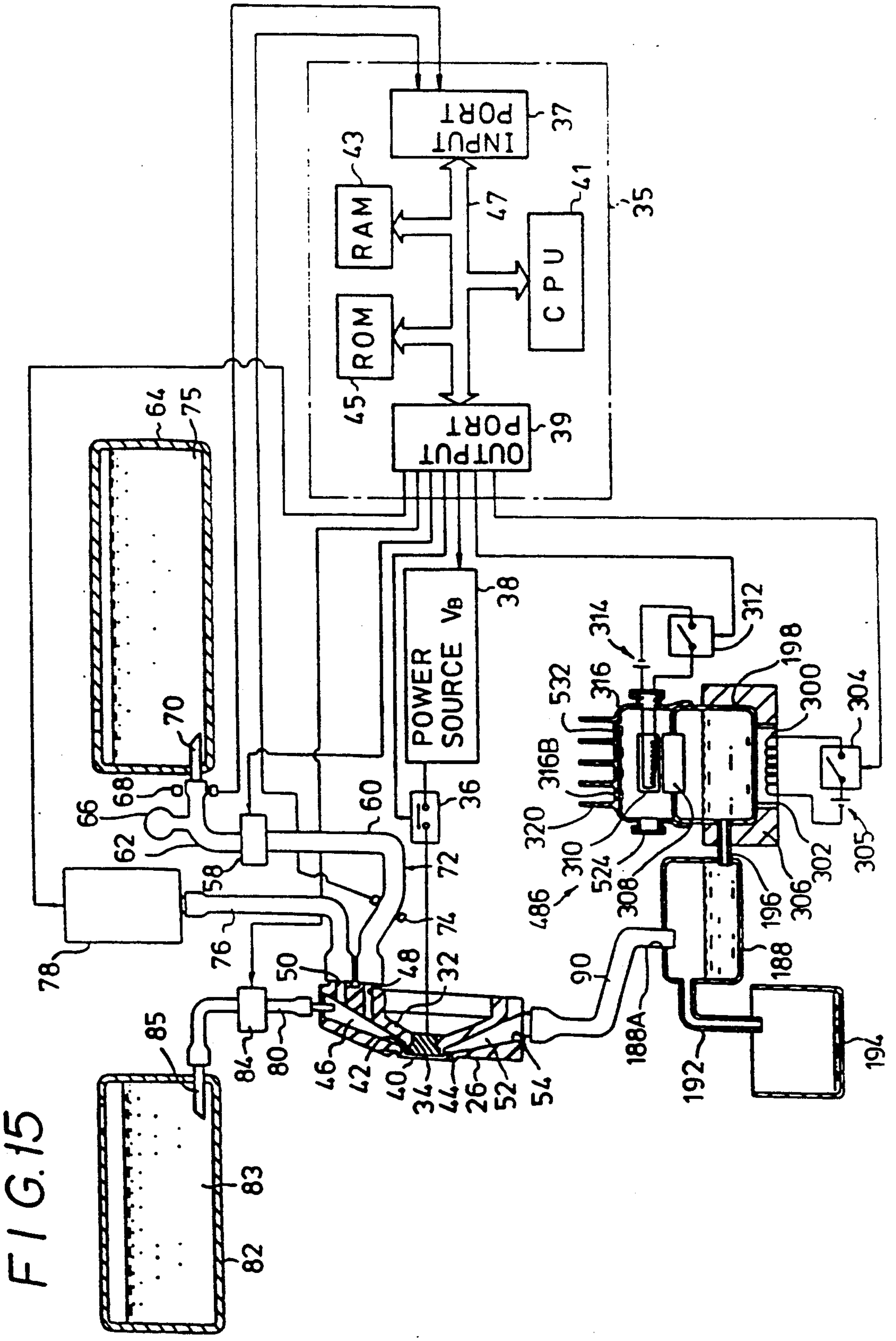
FIG. 15 is a sectional view of a sixth embodiment which shows the relationship between the development unit of a process head to which the present invention is applied and the other apparatus.

A sixth embodiment is described below with reference to FIGS. 15 to 17.

In this embodiment, the same parts, members and portions as those in the second embodiment are denoted by the same reference numerals and thus are not described below.

A developer treatment apparatus 486 in this embodiment is different from the developer treatment apparatus 186 in the second embodiment in the following points:

Two air supply ports 316A which allow the inside of the cover 316 to communicate with the outside thereof and which cause air to be supplied to the catalyst 308 are provided in the side wall of the cover 316 provided above the combustion tank 198 so as to cover the catalyst 308 and the catalyst igniting heater 310. A side wall 522 is provided around the periphery of each of the air supply ports 316A so as to stand erect thereon. A cover 524 is disposed on the opening 522A at the end of each of the side walls 522.

Figure 16:
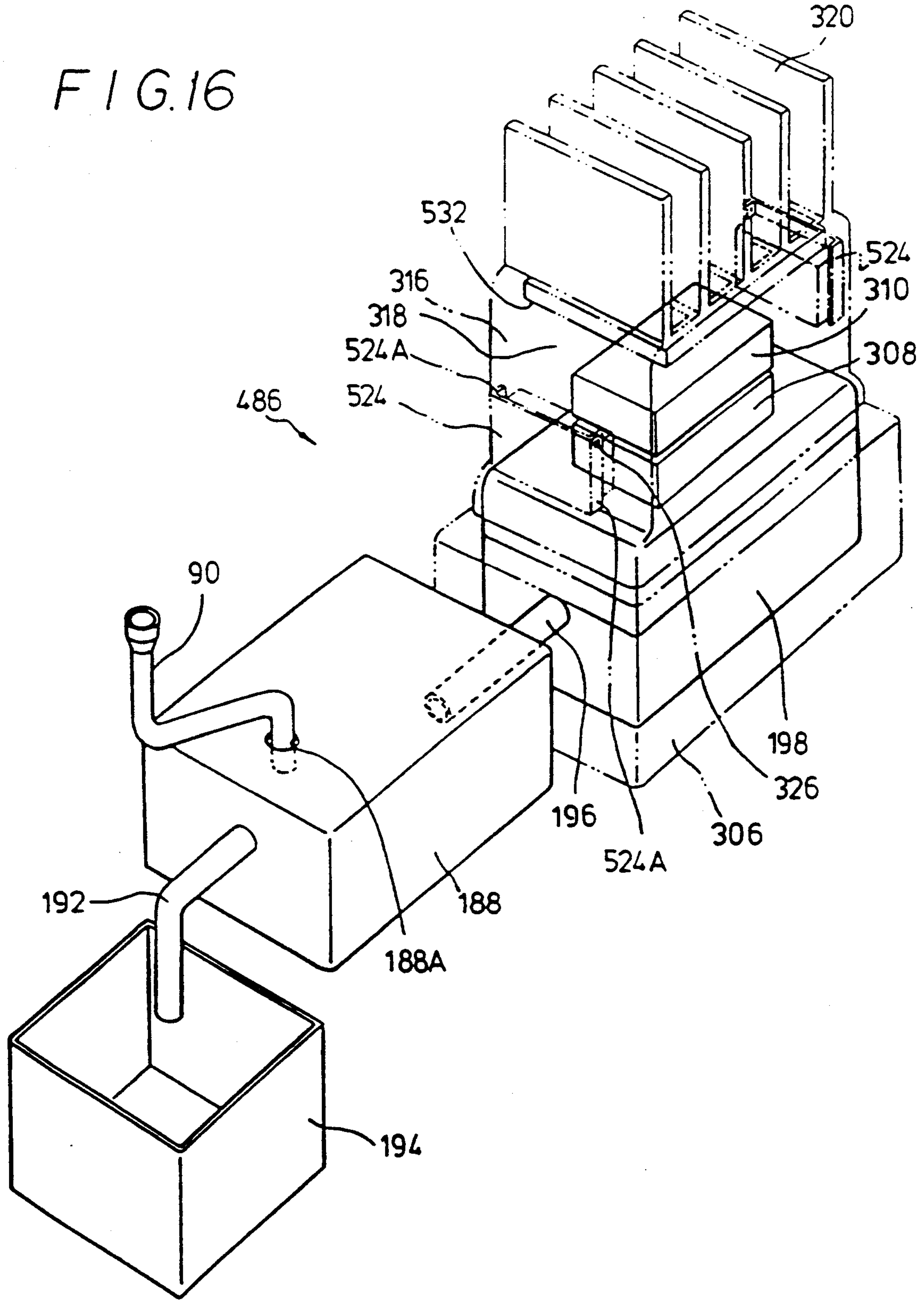
FIG. 16 is a perspective view of a developer treatment apparatus in the sixth embodiment.

Both ends of each of the covers 524 are so bent as to be brought into contact with the end of each of the side walls 522 to form side plates 524A, as shown in FIG. 16. The end of each of the side walls 522 is inserted into the portion between the side plates 524A, the covers 522 being respectively and pivotally supported by shafts 526 to the side walls 522.

Figure 17:
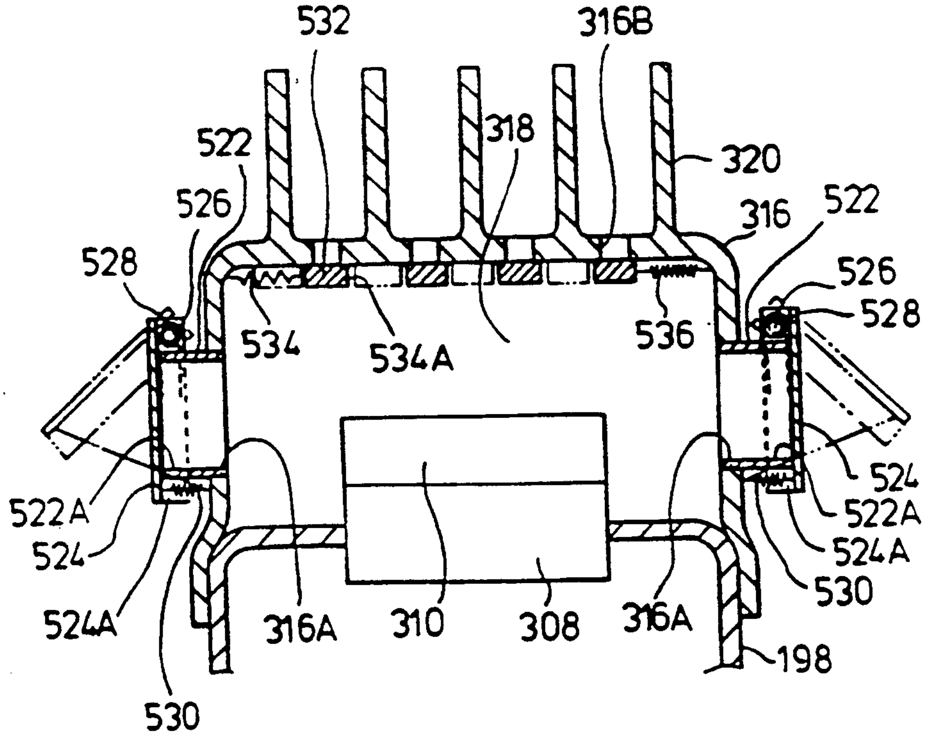
FIG. 17 is an enlarged sectional view of the air intakes and the exhaust ports shown in FIG. 15.

Torsion coil springs 528 are respectively interposed between the side walls 522 and the covers 524 so as to urge the covers 524 in the clockwise direction around the shafts 526 serving as the center as shown in FIG. 17 (the state shown by the two-dot chain lines in FIG. 17).

Wires 530 are respectively interposed between the covers 524 and the side walls 522. Each of the wires 530 used is composed of a shape memory alloy the shape of which is changed at a given temperature. Each of the wires 530 assumes a loose state at a low temperature as shown in FIG. 17, while it is changed into a coil-like form at a given temperature as shown by the solid line in FIG. 17 so that the covers 524 are each rotated against the urging force of the torsion coil springs 528 in the counterclockwise direction around the shafts 526 serving as the center to close the openings at the ends of the side walls 522. The air supply ports 316A are thus closed.

Four exhaust ports 316B are provided in the upper surface of the cover 316 so as to exhaust the gases in the exhaust chamber 318 to the air.

A movable cover 532 is also provided on the inside wall of the upper surface of the cover 316 and has exhaust ports 532A provided therein corresponding to the exhaust ports 316B. One end of the movable cover 523 is connected to one of the side walls of the cover 316 through a tensile coil spring 534, and the other end thereof is connected to the other side wall through a wire 536. The wire 536 used is composed of a shape memory alloy the shape of which is changed at a given temperature. This wire 536 assumes a loose state at a lower temperature (the state shown by the two-dot chain lines in FIG. 17) wherein the movable cover 532 is urged by the urging force of the tensile coil spring 534 toward the left side of FIG. 17, and the exhaust ports 316B correspond to the exhaust ports 316A. When the wire 536 is at a given temperature, the shape of the wire 536 is changed to a coil-like form so as to move the movable cover 532 against the urging force of the tensile coil spring 534 toward the right side of FIG. 17. The exhaust ports 316B are consequently closed (the state shown by the solid lines in FIG. 17).

The other members are the same as those in the second embodiment and thus are not described below.

Description will now be given of the function of this embodiment.

In this embodiment, the excess developer 75 discharged into the waste tank 188 is supplied to the combustion tank 198 from the pipeline 196 in the same way as in the second embodiment. At the start of the supply of the excess developer 75 into the waste tank 198, electricity is passed through the catalyst igniting heater 310, as well as the heater 300 being operated, so that the excess developer 75 in the combustion tank 198 is forced to vaporize by heating and then supplied to the catalyst 308. The oxidation of the excess developer 75 supplied is started by ignition by the catalyst igniting heater 310. Once the catalyst has been ignited, the heater 300 and the catalyst igniting heater 310 are stopped and the function of the catalyst 308 is maintained by the heat generated by the oxidation of the catalyst 308.

When the excess developer is continuously oxidized while the oxidation proceeding, the temperatures in the combustion tank 198, the cover 316 and the exhaust chamber 318 rise. The temperatures, however, generally does not become higher than a given temperature because of the radiation by the radiation fins 320.

When the capability of heat radiation is decreased owing to such a cause as a damage of the radiation fins or the deterioration of the function thereof, however, the temperatures of the combustion tank 198 and the cover 316 rise in some cases. In this embodiment, however, at a given temperature, the shapes of the wires 530 and 536 are changed into a coil-like form so that the covers 524 and the movable cover 532 are moved and the air supply ports 316A and the exhaust ports 316B are closed. Since the supply of air to the catalyst 308 is therefore stopped, oxidation is stopped and the temperatures of the combustion tank 198 and the cover 316 do not become higher than a given temperature.

As described above, this embodiment can prevent any increase in the temperature of the apparatus by stopping the supply of air to the catalyst 308 when the temperature is increased to a value over a given temperature by the oxidation of the catalyst.

The other functions of this embodiment are the same as those in the second embodiment and thus are not described below.

Although this embodiment is so configured that each of the barrier members is moved by the deformation of the shape memory alloy used, an embodiment may be alternatively so configured that each of the barrier members itself is formed by a shape memory alloy and has such a shape that ordinarily permits air to pass therethrough and is changed into a form which enables air to be shut off at a given temperature or higher.

Figure 18:
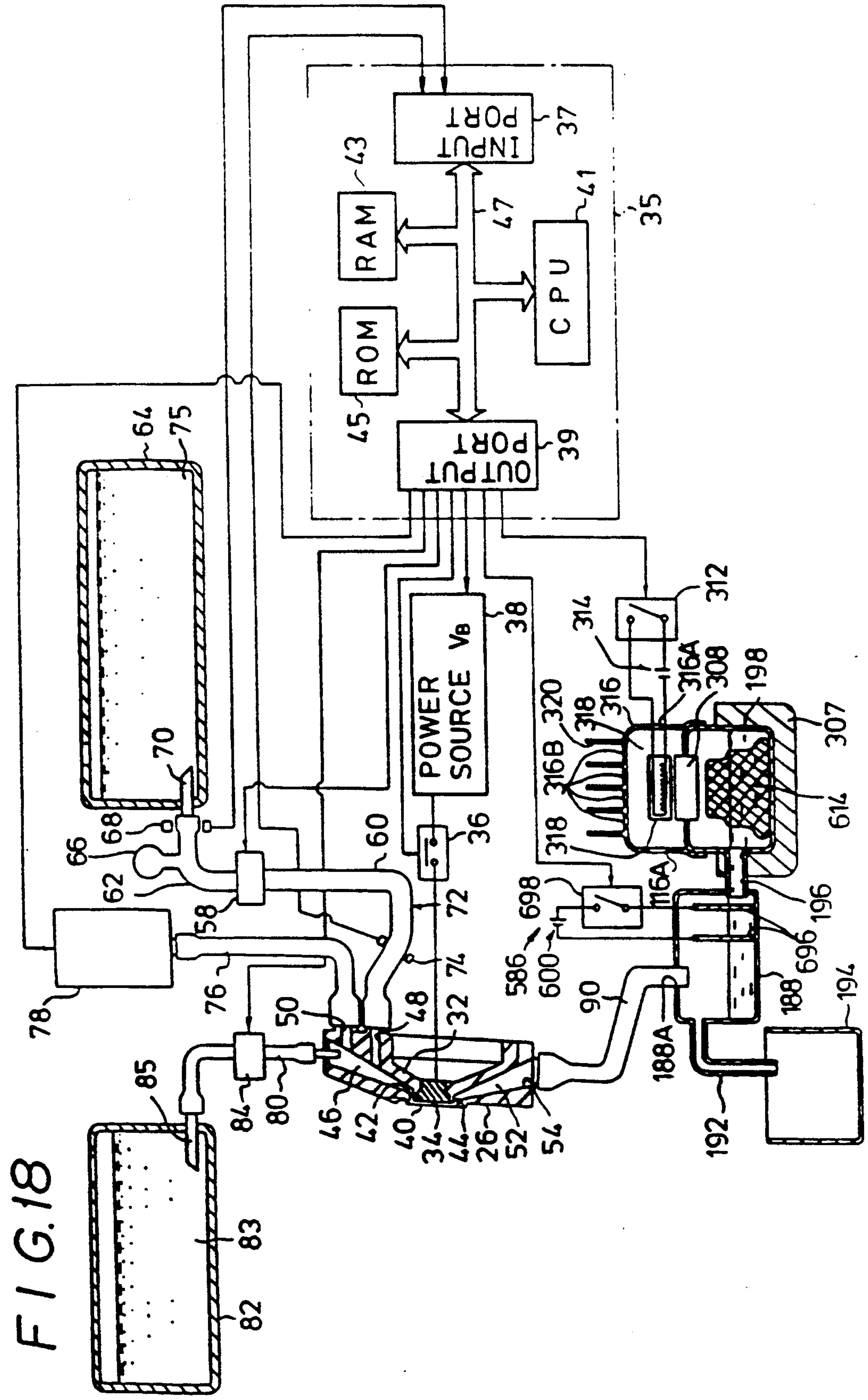
FIG. 18 is a sectional view of a seventh embodiment which shows the relationship between the development unit of a process head to which the present invention is applied and the other apparatus.
Figure 19:
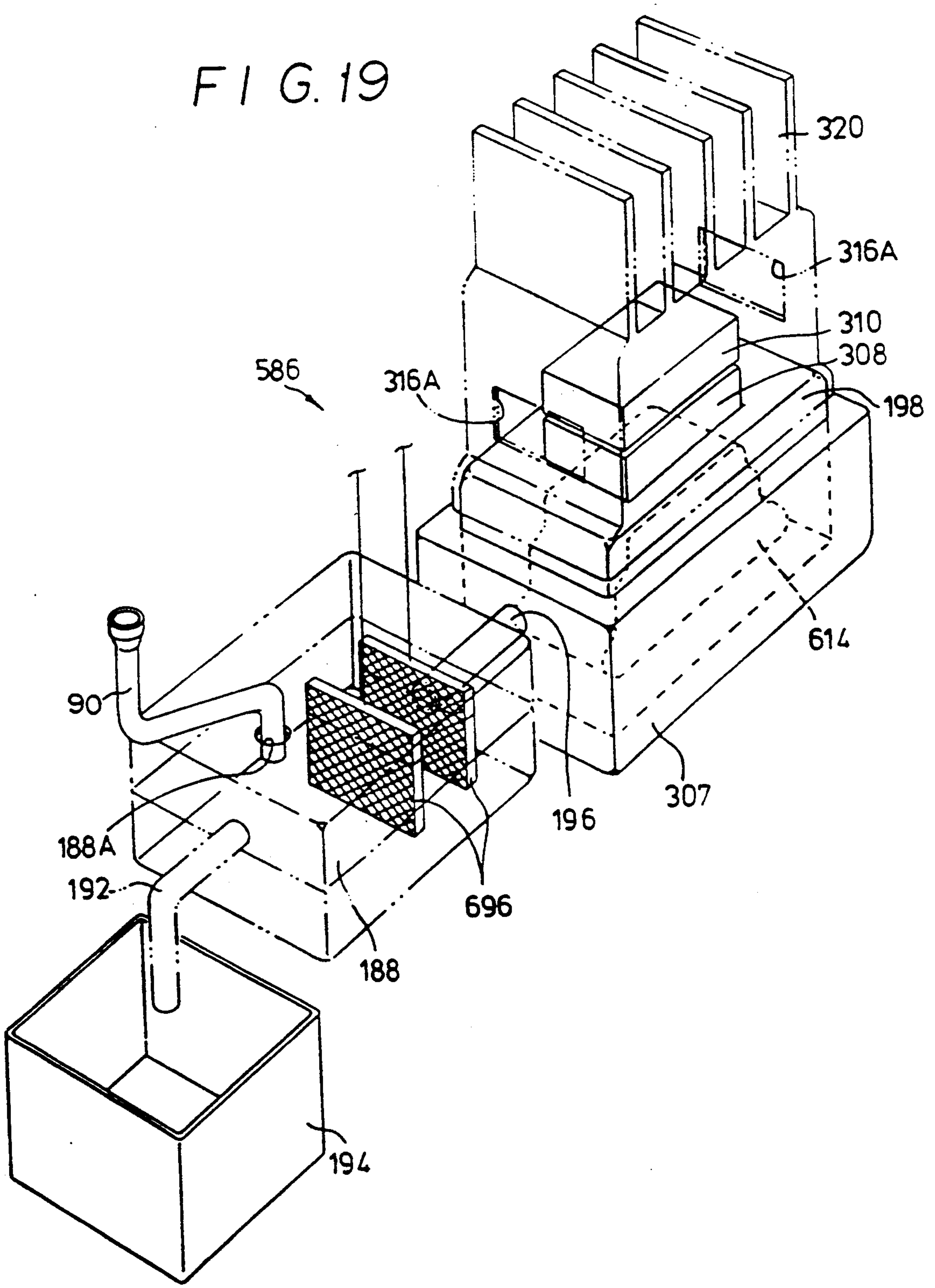
FIG. 19 is a perspective view of the developer treatment apparatus in the seventh embodiment.

A seventh embodiment of the present invention is described below with reference to FIGS. 18 and 19.

In this embodiment, the same parts, members and portions as those in the second embodiment are denoted by the same reference numerals and thus are not described below.

A developer treatment apparatus 586 in this embodiment is different from the developer treatment apparatus 186 in the second embodiment in the following points:

Two electrodes 696 are disposed in the waste tank 188 so as to face the opening of the pipeline 196 causing the waste tank 188 to communicate with the combustion tank 198.

A power source 600 is connected between these electrodes 696 through a relay contact point 698. The relay contact point 698 is connected to the output port 39 of the control circuit 35. Each of the electrodes 696 is formed as a network form so as to allow the excess developer to pass therethrough, as shown in FIG. 19.

The toner particles which are contained in the excess developer discharged into the waste tank 188 and which are electrified to have the negative polarity are therefore electrodeposited on one of the two electrodes 696 which is connected to the positive polarity and separated from the solvent of the developer. The solvent from which the toner particles are separated is passed through the pipeline 196 and then sent to the combustion tank 198.

A wick 614 is also disposed in the combustion tank 198 and has the top which is increased to a position near the lower surface of the catalyst 308. The solvent sent to the combustion tank 198 is thus raised to the top while passing through the wick 614, vaporized from the top thereof and then supplied to the catalyst 308. The wick 614 used is made of heat resistant fibers such as glass fibers or the like.

The periphery of the bottom of the combustion tank 198 and the periphery of the side walls thereof are covered with the heat insulator 307 so that the temperature of the combustion tank 198 raised by the oxidation of the catalyst 308 is prevented from lowering. In other words, once the catalyst 308 has been ignited by the heater 310, the oxidation of the catalyst 308 is maintained by the heat generated by the oxidation, and the temperature of the combustion tank is also raised by the heat generated so that the solvent can be easily vaporized. For this reason, the heat insulator 307 is provided so as to prevent any lowering of the temperature of the combustion tank 198.

The other members are substantially the same as those in the second embodiment and thus are not described below.

Description will now be given of the function of this embodiment.

In this embodiment, the toner particles contained in the excess developer 75 discharged to the waste tank 188 are electrodeposited on one of the electrodes 696 and are separated from the solvent of the developer. The solvent without the toner particles is passed through the pipeline 196, sent to the combustion tank 198, raised while passing through the wick 614, and then vaporized from the top thereof. The solvent vaporized is oxidized when passed through the catalyst 308. In this case, the catalyst is heated by the catalyst igniting heater 310 to a temperature at which the catalytic function thereof can be satisfactorily exhibited.

The solvent vaporized is composed of a hydrocarbon ($C_nH_m$) as a main component and is changed into carbon dioxide ($nCO_2$) and water vapor ($m/2H_2O$) when oxidized by the catalyst 308 which are then discharged to the air from the exhaust tank 118 through the exhaust ports 116B. The solvent contained in the excess developer is consequently disposed of.

The toner particles which are electrodeposited on one of the electrodes 696 can be easily treated by cleaning the electrodes 696 separated from the waste tank 188 or by exchanging the electrodes 696 by other electrodes.

The catalyst igniting heater 310 is stopped after the catalyst 308 has been ignited so as to start the oxidation of the catalyst 308. This is because the function of the catalyst 308 is maintained by the heat generated by the oxidation of the catalyst 308 once the oxidation of the catalyst 308 has been started. The catalyst 308 therefore continuously functions during the time the solvent is vaporized from the top of the wick 614 and supplied to the catalyst 308.

In addition, the heat insulator 307 prevents any lowering of the temperature of the combustion tank 198 so that the solvent can be easily vaporized.

As described above, in this embodiment, since the solvent is vaporized and then supplied to the catalyst 308 after the toner particles contained in the excess developer 75 have been separated therefrom, no toner particle reaches the catalyst 308. The solvent contained in the excess developer can thus be treated without preventing the oxidation of the catalyst 308.

The other functions of this embodiment are the same as those of the second embodiment and thus are not described below.

Although this embodiment uses the electrodes 696 which are disposed in the waste tank 188, the electrodes may alternatively be disposed at an intermediate position of the pipeline 90 or in the portion of the pipeline 90 which opens to the waste tank 188.

An eighth embodiment of the present invention is described below with reference to FIGS. 20 an 21.

In this embodiment, the same parts, members and portions as those in the second embodiment are denoted by the same reference numerals and thus are not described below.

Figure 20:
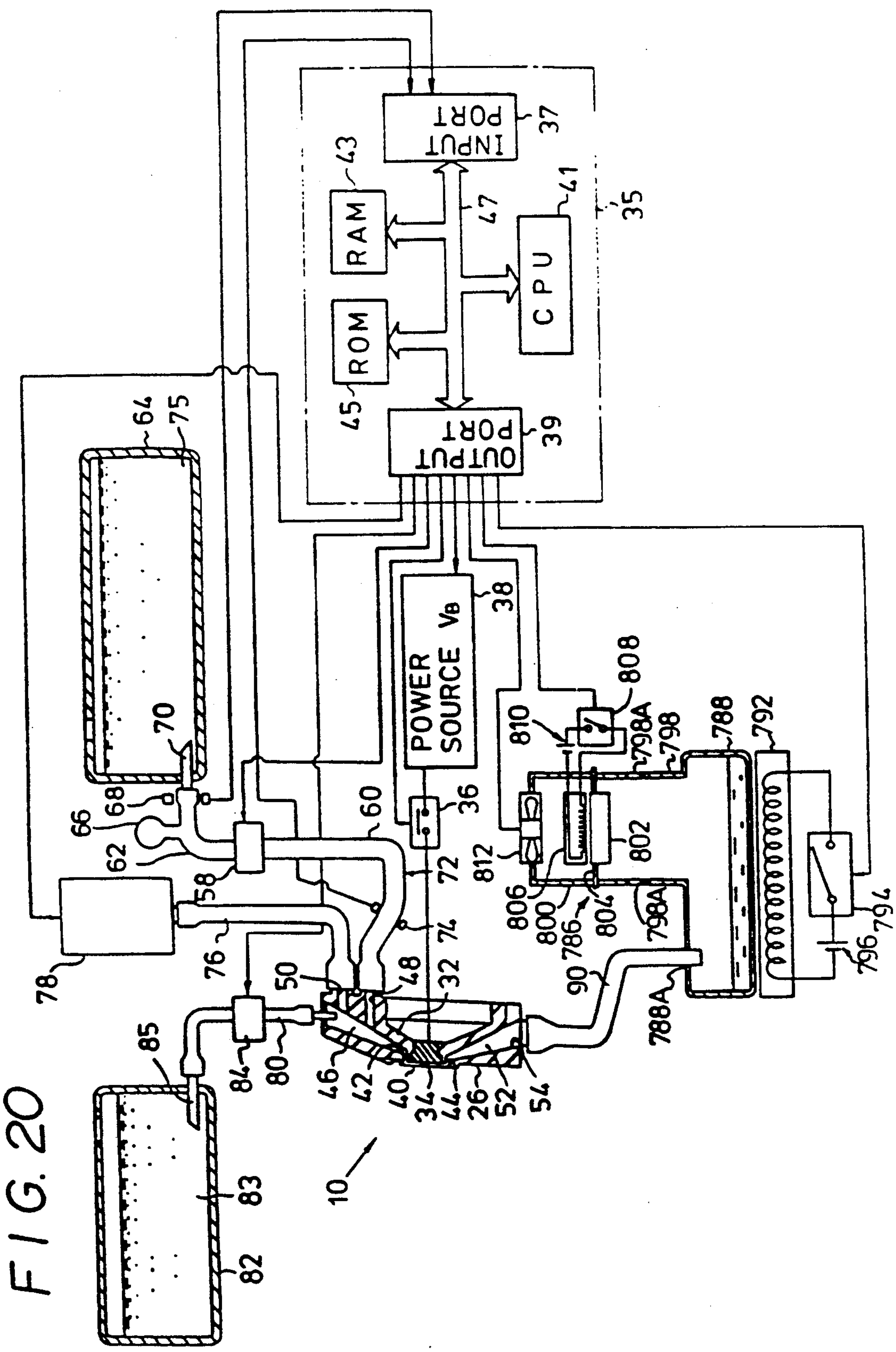
FIG. 20 is a sectional view of a eighth embodiment which shows the relationship between the development unit of a process head to which the present invention is applied and the other apparatus.
Figure 21:
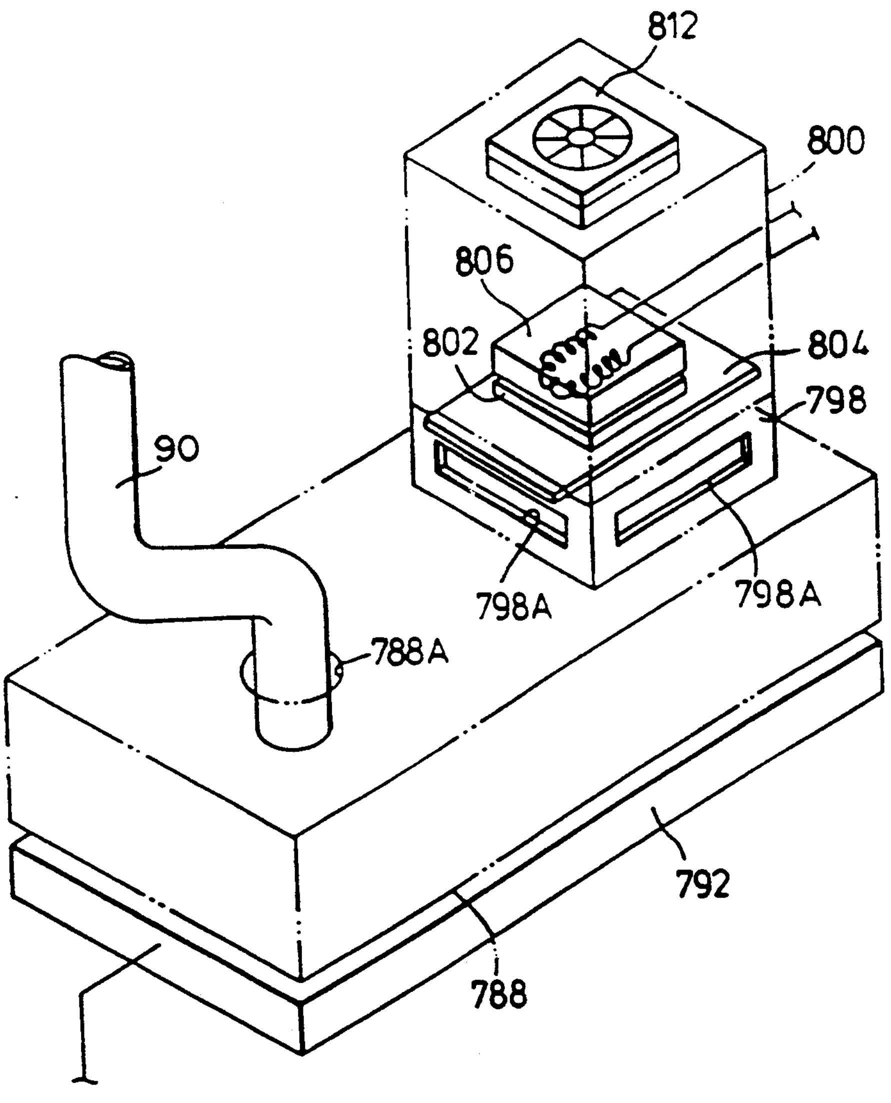
FIG. 21 is a perspective view of a developer treatment apparatus in the eighth embodiment showing the interior.

As shown in FIGS. 20 and 21, a developer treatment apparatus 786 is provided with a waste tank 788. A through hole 788A is provided on the side of the upper surface of the waste tank 788. One end of the pipeline 90 is inserted into the through hole 788A. The other end of the pipeline 90 is made to communicate with the developer and squeeze air exhaust port 54. The excess developer 75 discharged from the developer and squeeze air exhaust port 54 is thus exhausted to the waste tank 788 of the developer treatment apparatus 786.

A heater is disposed below the lower surface of the waste tank 788 and is connected to a power source 796 through a relay contact point 794. The relay contact point 794 is connected to the output port 39 of the control circuit 35. The heater 792 functions to heat the bottom of the waste tank 788 so as to vaporize the excess developer in the waste tank 788.

A pipe 798 having a rectangular cross-sectional form is provided on an upper portion of the waste tank 788 so as to stand erect thereon. An exhaust tank 800 is also connected to the end of the pipe 798.

The pipe 798 has air intakes 798A which are provided around the periphery thereof so that air can be introduced into the pipe 798.

A catalyst 802 is disposed above the pipe 798. The catalyst 802 is provided above the pipe 798 so as to close the upper portion of the pipe 798, as well as being fixed in the central portion of a partition 804 which serves to partition off the pipe 798 from the exhaust tank 800 in such a manner that the lower surface of the catalyst 802 is exposed to the inside of the pipe 798 and the upper surface thereof is exposed to the inside of the exhaust tank 800.

An ignition heater 806 is disposed on the upper surface of the catalyst 802. The ignition heater 806 is connected to a power source 810 through a relay contact point 808 interposed therebetween. The relay contact point 808 is connected to the output port 39 of the control circuit 35. The oxidation of the catalyst 802 (oxidation of the vaporized excess developer) is started by activating the ignition heater 806 to change the excess developer into carbon dioxide and water vapor.

An exhaust fan 812 is provided in the upper surface of the exhaust tank 800. The carbon dioxide and water vapor in the exhaust tank 800 are discharged to the atmosphere by operation of the exhaust fan 812.

The other members are same as those in the first embodiment and thus are not described below.

Description will now be given of the function of this embodiment.

Figure 22:
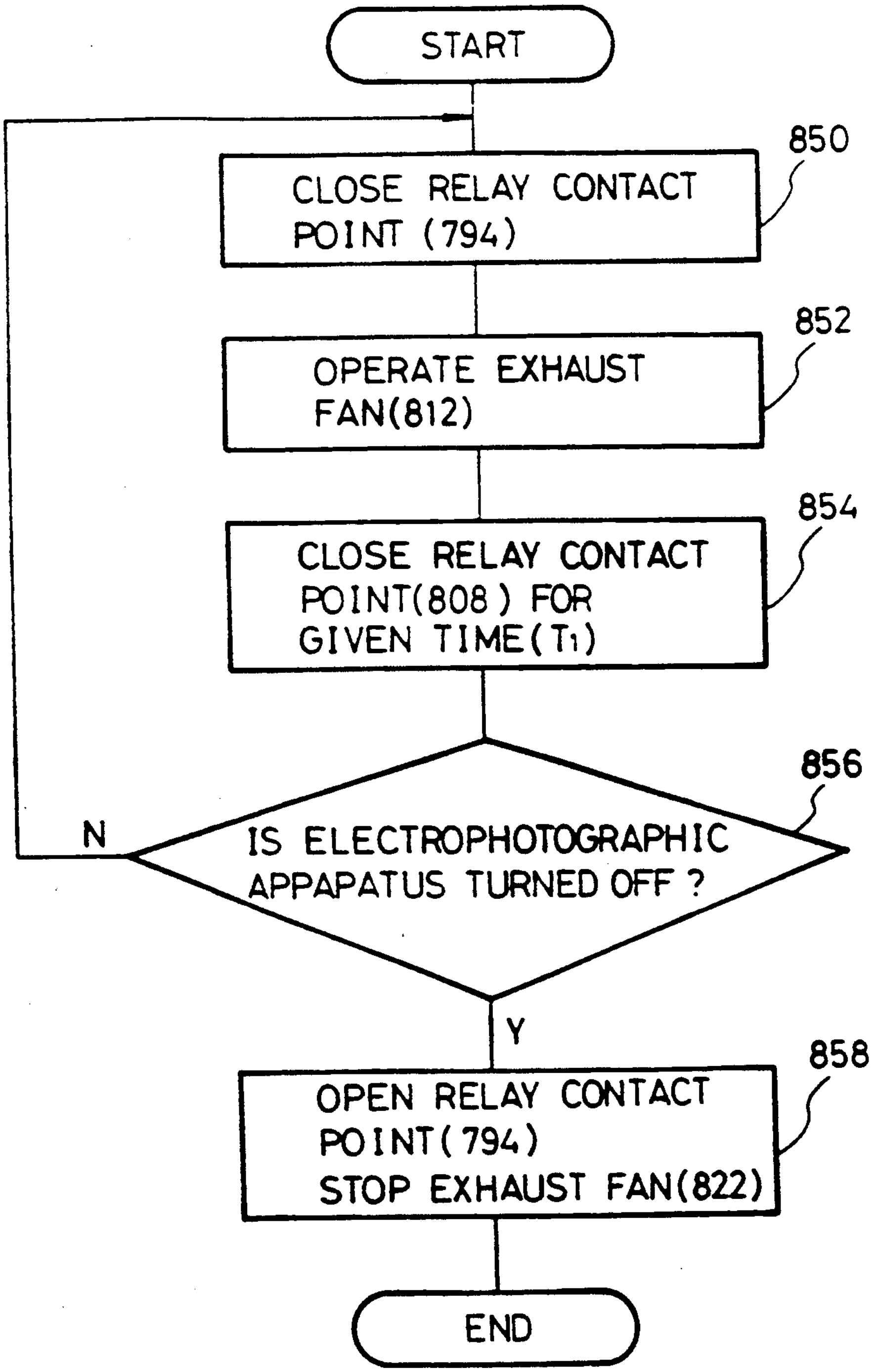
FIG. 22 is a flow chart showing the operation of the developer treatment apparatus in the eighth embodiment.

The operation of the developer treatment apparatus 786 for treating the excess developer 75 flowing down from the development chamber 40 is described below with reference to FIGS. 22. When the power source of an electrophotographic apparatus in which the process head 10 is incorporated is turned on, the relay contact point 794 is closed and the heater 792 is operated, as well as the exhaust fan 812 being operated (Steps 850, 852). The relay contact point 808 is then closed for a given time T (Step 854). The excess developer vaporized by the heater 792 is thus oxidized by the function of the catalyst 802.

Judgement is made as to whether the electrophotographic apparatus is turned off in Step 856. If the apparatus is not turned off, the heater 792 and the exhaust fan 812 are operated, and if the apparatus is turned off, the relay contact point 794 is opened and the exhaust fan 812 is stopped.

The excess developer discharged into the waste tank 788 is vaporized by being heated by the heater 792 which is previously activated. The vaporized excess developer is raised in the pipe 798 and passed through the catalyst 802. The air introduced from the air intakes 798A is supplied to the catalyst 802 together with the vaporized excess developer. The vaporized excess developer is thus oxidized when passed through the catalyst 802. In this case, the catalyst 802 is heated by the ignition heater 806 to a temperature at which the catalytic function can be sufficiently exhibited (Step 854 in FIG. 22).

The components of the excess developer vaporized by the heater 792 are the products of evaporation of the solvent which is composed of a hydrocarbon ($C_nH_m$) as a main component. The components are reacted with oxygen ($O_2$) in the air introduced from the air intakes 798A when passed through the catalyst 802 to be changed into carbon dioxide ($nCO_2$) and water vapor ($m/2H_2O$). The carbon dioxide ($nCO_2$) and water vapor ($m/2H_2O$) are discharged to the atmosphere from the exhaust tank 800 by means of the exhaust fan 812 which is previously operated The carbon dioxide and water vapor are odorless and have no damage on the environment if they are exhausted to the air. The solvent which is the solvent component of the excess developer and which is mainly composed of a hydrocarbon can thus be readily treated, resulting in the treatment of the excess developer.

Although the toner particles contained in the excess developer remain in the waste tank 788, the amount of the remaining toner particles is small because the toner particles remain after the developer used for development has been vaporized. The toner particles can therefore be teated by regularly cleaning the waste tank 788 or by exchanging the waste tank 788 to another one.

The ignition heater 806 for heating the the catalyst 802 to a temperature at which the catalyst can functions is stopped after the catalyst 802 has been oxidized. This is because the catalytic function of the catalyst 802 is maintained by the heat generated by the oxidation during the time the vaporized excess developer is supplied thereto once the catalyst 802 has been ignited.

The excess developer 75 is therefore treated by being changed into carbon dioxide and water vapor and then exhausted to the atmosphere.

The other functions of this embodiment are the same as those of the second embodiment and thus ar not described below.

What is claimed is:

1. In a developer treatment apparatus for treating excess developer after development of a film in a development chamber with said developer which contains a solvent composed of a hydrocarbon as a main component and a pigment dispersed in said solvent, the improvement of said developer treatment apparatus comprising:

a tank for receiving said excess developer, said tank having an opening for receiving an inflow of said excess developer exhausted from said development chamber;

a passage connected between said development chamber and said tank opening through which said excess developer is supplied to said tank after development in said development chamber;

a catalyst for oxidizing said excess developer received in said tank by converting said excess developer into gases made of water vapor and carbon dioxide and discharging said gases;

a vaporization means for vaporizing said excess developer received in said tank, and for supplying vapor of said excess developer to said catalyst;

a catalyst igniting heater for first oxidizing said vaporized excess developer;

means for intermittently supplying new developer to said development chamber;

means for supplying electricity to said catalyst igniting heater after said new developer, which has been supplied to said development chamber by said developer supplying means, flows into said tank through said passage and said tank opening, such that the vapor of said excess developer is spontaneously combustible even when said development treatment apparatus, said vaporization means and said catalyst igniting heater are turned off.

2. A developer treatment apparatus according to claim 1, wherein said vaporization means comprises a liquid absorbing member which is disposed in said tank and which serves to absorb said excess developer received in said tank and to vaporize it from the top thereof.

3. A developer treatment apparatus according to claim 2, wherein said liquid absorbing member comprises a liquid absorbing cotton or a wick.

4. A developer treatment apparatus according to claim 1, wherein said vaporization means comprises a heating means that serves to vaporize said excess developer which is received in said tank.

5. A developer treatment apparatus according to claim 1 further comprising a receiving chamber for covering part of said catalyst and receiving the gases produced by the oxidation.

6. A developer treatment apparatus according to claim 5, wherein said receiving chamber has an exhaust means for discharging said gases produced to the atmosphere.

7. A developer treatment apparatus according to claim 6, wherein said exhaust means comprises an exhaust fan which is provided on a cover that demarcates part of said receiving chamber.

8. A developer treatment apparatus according to claim 6, wherein said receiving chamber has an air control means for reducing the quantity of air supplied to said catalyst as the temperature of said catalyst increases.

9. A developer treatment apparatus according to claim 8, wherein said air control means comprises a bimetal for substantially changing the area of an air supply opening formed in said cover that demarcates part of said receiving chamber.

10. A developer treatment apparatus according to claim 1 further comprising a radiation means which radiates a heat of combustion.

11. A developer treatment apparatus according to claim 10, wherein said radiation means comprises radiation fins provided on the outside of a cover for covering part of said catalyst and for receiving the gases produced by said oxidation.

12. A developer treatment apparatus according to claim 1 further comprising an electrodeposition means for electrodepositing the pigment contained in said excess developer.

13. A developer treatment apparatus according to claim 1 further comprising a cover for covering part of said catalyst and for receiving the gases produced by said oxidation, an air supply port which is formed in said cover and which serves to supply air to said catalyst and a barrier means for shutting off said air by closing said air supply port when the temperature in said cover becomes above a given value.

14. A developer treatment apparatus according to claim 13, wherein said barrier means is provided with a member made of a shape memory alloy which is deformed at a temperature higher than said given temperature so as to shut off said air by the deformation of said member.

15. A developer treatment apparatus according to claim 1 further comprising a barrier means which has a barrier member that serves to shut off air supplied to said catalyst and a low-melting point alloy that will melt at a given temperature or higher and that enables said barrier member to operate so as to shut air.

* * * * *